(12) United States Patent
Porshnev et al.

(10) Patent No.: US 7,160,521 B2
(45) Date of Patent: Jan. 9, 2007

(54) TREATMENT OF EFFLUENT FROM A SUBSTRATE PROCESSING CHAMBER

(75) Inventors: Peter Porshnev, San Jose, CA (US); Sebastien Raoux, Cupertino, CA (US); Mike Woolston, San Jose, CA (US); Christopher L. Aardahl, Richland, WA (US); Rick J. Orth, Kennewick, WA (US); Kenneth G. Rappe, Richland, WA (US)

(73) Assignee: Applied Materials, Inc., Santa Clara, CA (US)

( * ) Notice: Subject to any disclaimer, the term of this patent is extended or adjusted under 35 U.S.C. 154(b) by 241 days.

(21) Appl. No.: 10/342,121

(22) Filed: Jan. 13, 2003

(65) Prior Publication Data

US 2004/0001787 A1   Jan. 1, 2004

Related U.S. Application Data

(63) Continuation-in-part of application No. 09/905,654, filed on Jul. 11, 2001, now Pat. No. 6,962,679.

(51) Int. Cl.
*B01J 19/08* (2006.01)
(52) U.S. Cl. .................................. 422/186.04
(58) Field of Classification Search ............ 422/186.04
See application file for complete search history.

(56) References Cited

U.S. PATENT DOCUMENTS

| | | | | | |
|---|---|---|---|---|---|
| 3,218,781 | A | * | 11/1965 | Allemann et al. | 96/52 |
| 5,827,407 | A | * | 10/1998 | Wang et al. | 204/164 |
| 6,309,610 | B1 | * | 10/2001 | Nejezchleb et al. | 422/186.04 |
| 2003/0012718 | A1 | | 1/2003 | Josephson et al. | |

FOREIGN PATENT DOCUMENTS

| | | |
|---|---|---|
| DE | 215706 | 11/1984 |
| DE | 4319118 | 12/1994 |
| DE | 19526737 | 1/1997 |
| EP | 0885648 | 12/1993 |
| EP | 0820801 | 1/1998 |
| EP | 0916388 | 5/1999 |
| EP | 1224964 | 7/2002 |
| JP | 51129868 | 11/1976 |
| JP | 58045718 | 3/1983 |
| JP | 4110013 | 8/1990 |
| JP | 4247218 | 1/1991 |
| JP | 5125928 | 10/1991 |

(Continued)

OTHER PUBLICATIONS

"ASTRON™—Atomic Fluorine Generator" website located at www.astex.com.

(Continued)

*Primary Examiner*—Kishor Mayekar
(74) *Attorney, Agent, or Firm*—Ashok K. Janah

(57) ABSTRACT

A substrate processing apparatus has a process chamber and an effluent treatment reactor. The process chamber has a substrate support, a process gas supply, a gas energizer, and an exhaust conduit. The effluent treatment reactor has an effluent inlet to receive effluent from the exhaust conduit of the process chamber, a plasma cell having one or more electrodes electrically connected to a voltage source adapted to electrically bias the electrodes to couple energy to effluent received in the plasma cell, a scrubbing cell coaxially exterior to the plasma cell, the scrubbing cell having a scrubbing fluid inlet to introduce scrubbing fluid into effluent in the scrubbing cell and a scrubbing fluid outlet, and an effluent outlet to release the treated effluent.

13 Claims, 14 Drawing Sheets

FOREIGN PATENT DOCUMENTS

| | | |
|---|---|---|
| JP | 5261242 | 3/1992 |
| JP | 7197806 | 12/1993 |
| JP | 10192653 | 7/1998 |
| JP | 2227117 | 2/1999 |
| JP | 2001087621 | 9/1999 |
| WO | WO-8800088 A1 | 1/1988 |
| WO | WO99/61132 | 2/1999 |
| WO | WO99/26726 | 6/1999 |
| WO | WO-01032297 A2 | 5/2001 |

OTHER PUBLICATIONS

Two view graphs (Astron) which were used in a presentation at Applied Materials, Inc. on Mar. 10, 1999.
"ESCAPE"—DAS, www.das.tz-dd.de/English/products/products.html.
"LITMAS"—Litmas Blue, Foreline Abatement Systems & Litmas Red, Atmospheric Pressure Plasma System—www.litmas.com/products/html.
"CENTROTHERM"—Atmospheric Plasma Scrubber, www.centrotherm.de/products/environmental/environmental.htm.
"EDWARDS"—GP-Wet Scrubbers, www.edwards.boc.com/exhaust_manage/gp-wet.html.
Evans et al., "Plasma remediation of trichloroethylene in silent discharge plasmas," J. Appl. Phys. 74:9 pp. 5378-5387 (1993).
Flippo et al., Abatement of Fluorine Emissions Utilizing an ATMI CDO™ Model 863 with Steam Injection (2001).
Grothaus et al., "Harmful Compounds Yield to Nonthermal Plasma Reactor," SWRI Technology Today, www.swri.rg, pp. 1-9 (published in Technology Today, Spring 1996).
International Sematech Disclosure, "Evaluation of a Litmas 'Blue' Point-of-Use (POU) Plasma Abatement Device for Perfluorocompound (PFC) Destruction," Technology Transfer No. 98123605A-Eng (Dec. 15, 1998).
Lester, "Clean Processing. No More PFC Emissions in Plasma Chamber Cleaning?" Semiconductor, p. 46 (2000).
Rosenthal et al., "Corona Discharge for Surface Treatment," IEEE Trans. Ind. Appln., 1-5, pp. 328-335 (1975).
Timms et al., "The chemistry of volatile waste from silicon wafer processing," J. Chem. Soc., pp. 815-822 (1999).
Vartanian et al., "Plasma Abatement Reduces PFC Emission," Semiconductor International, pp. 191-198 (2000).
PCT International Search Report for International Application No. PCT/US02/22055, mailed Oct. 21, 2002.

* cited by examiner

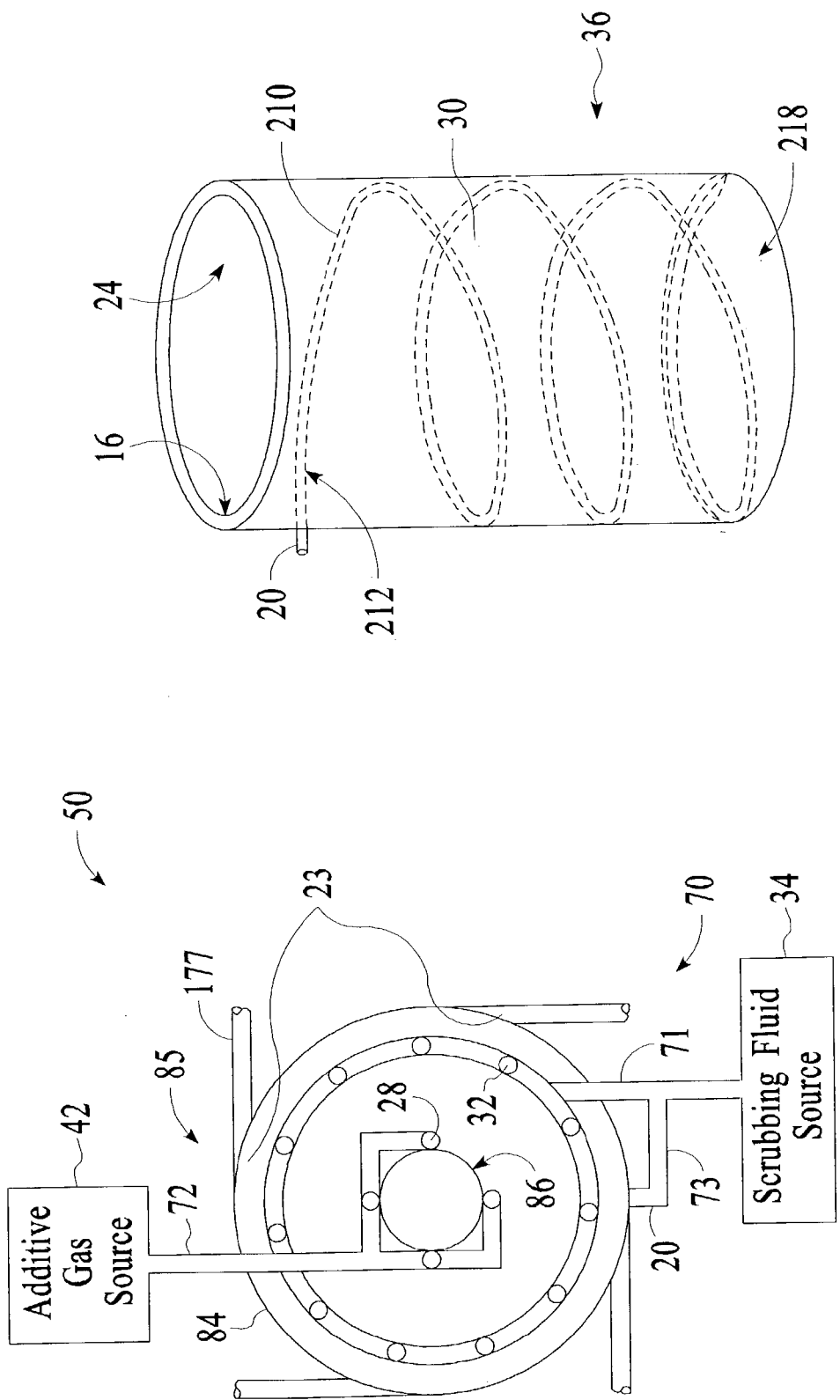

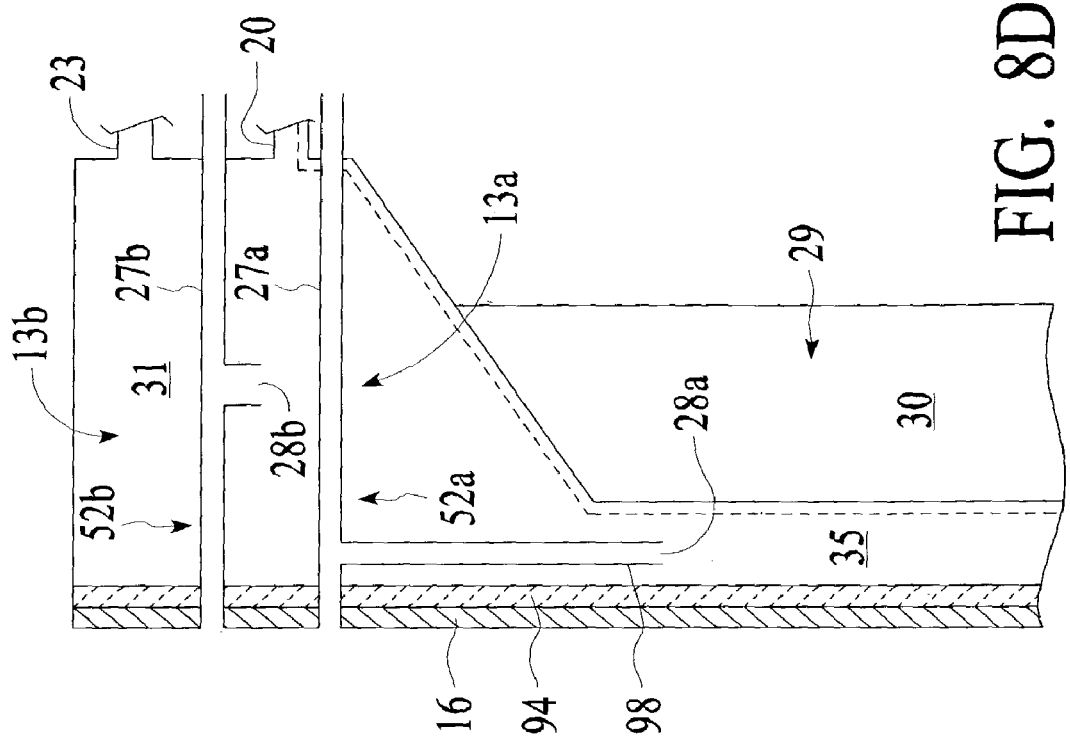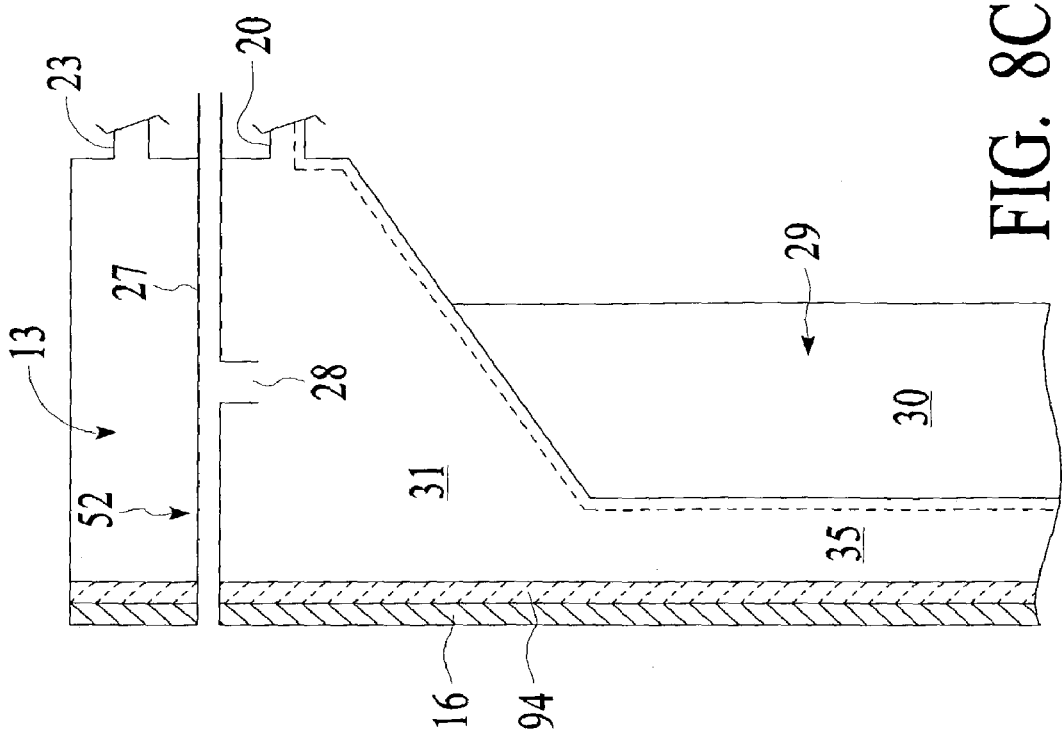

TREATMENT OF EFFLUENT FROM A SUBSTRATE PROCESSING CHAMBER

CROSS-REFERENCE

This application is a continuation-in-part of U.S. patent application Ser. No. 09/905,654, entitled "Processes and Apparatuses for Treating Halogen-Containing Gases," to Josephson et al, assigned to Battelle Memorial Institute, and filed on Jul. 11, 2001 now U.S. Pat. No. 6,962,679, which is herein incorporated by reference in its entirety.

BACKGROUND

The present invention relates to the treatment of an effluent from a substrate processing chamber.

In a substrate processing chamber, electronic circuits and displays are fabricated on substrates such as semiconductor wafers and glass. In such chambers, semiconductor, dielectric, and conductor materials, are formed on the substrate by chemical vapor deposition (CVD), physical vapor deposition (PVD), oxidation, nitridation, ion implantation and etching processes. In CVD processes, a reactive gas is used to deposit material on the substrate. In PVD processes, a target is sputtered to sputter deposit material on the substrate. In oxidation and nitridation processes, an oxide or nitride material is formed on the substrate by exposing the substrate to a suitable gaseous environment. In ion implantation, ions are implanted into the substrate. In subsequent etching processes, etch-resistant features comprising resist or hard-mask, are formed on the substrate and the exposed portions of the substrate between the etch-resistant features (substrate open area) are etched to form patterns of gates, vias, contact holes or interconnect lines. Chamber cleaning processes may also be used to clean the chamber in-between processing of batches of substrates. These processes are often performed with energized gases, such as for example, RF (radio frequency) plasmas, LF (low frequency) plasmas, and microwave activated gases, but may also be performed with suitable non-energized gas compositions. They are also often performed at low or sub-atmospheric pressures.

The effluent generated in these processes can often contain different compositions of flammable and/or corrosive gases, sub-micron sized process residue particulates and gas phase nucleated materials, and other hazardous or environmentally polluting compounds. For example, the effluent may contain different compositions of halogen containing gases, perfluorocompounds (PFCs), chlorfluorocompounds (CFCs), hazardous air products (HAPs), and volatile organic compounds (VOCs). The effluent gases can contain unreacted or excess portions of the process gas used for processing the substrate or cleaning the chamber, as well as reaction byproducts that arise from reactions between dissociated and ionized species formed in the energized gas in the chamber. In one version of an etching process to etch layers of silicon dioxide, the effluent can contain etchant gases such as fluoride and other halogen containing gases and PFCs, along with silicon-containing particulates that are formed during processing. Chamber cleaning processes that use fluorinated gases, such as $F_2$, $CF_4$, $NF_3$, $C_3F_8$, and $C_4F_8O$ and other fluorine-containing gases to clean process residues from the chamber walls, can also exhaust effluent containing various combinations and formulations of fluorinated gases, PFCs, and residue particulates. Also, in the deposition of dielectrics, such as silicon dioxide, or low K dielectrics such as silicon oxycarbide, an excess of a silicon-containing gas, such as for example, trimethylsilane gas, is used to generate the desired deposition on the substrate and as much as about 60% of the trimethylsilane introduce in the chamber can end up in the effluent stream.

The effluent can be treated in an effluent treatment reactor, such as for example an effluent combustion chamber, to reduce the emissions of the hazardous and pollutant gases into the environment. However, it is difficult to treat different compositions of effluents to reduce, for example, their PFC content to a desirably low level without other adverse effects, such as for example, simultaneously causing excessive erosion of the internal walls and surfaces of the effluent chamber. For example, chamber surfaces made from aluminum can be easily eroded by chlorine or fluorine containing gases, such as for example, HF and $NF_3$. The erosive effect of the effluent can be especially strong at the high temperatures needed to treat the effluent in combustion reactors.

Another problem arises when residue and particulate materials are present in the effluent. Such particulates are often sub-micron sized and they can accumulate in and clog up the pipes and apertures of the effluent treatment reactor. A conventional filter placed in the effluent path can filter out such particulates. However, the filter may also impede the flow rate of effluent through the exhaust causing a back-pressure to develop in the processing chamber. The back-pressure is undesirable because it can increase the low or sub-atmospheric operating pressure maintained in the processing chamber.

Accordingly, it is desirable to have an effluent treatment system capable of effectively treating different compositions of effluent to control their emissions and minimize the release of hazardous or pollutant gases into the environment. It is also desirable to remove particulates present in the effluent during treatment of the effluent without causing excessive back-pressure of effluent gases into the chamber. It is further desirable to have an effluent treatment reactor capable of withstanding erosion and corrosion from the halogenated gases and byproducts of the effluent.

SUMMARY

In one embodiment, an effluent treatment reactor is capable of treating an effluent exhausted from a process chamber. The reactor comprises an effluent inlet to receive the effluent from the process chamber. A plasma cell of the reactor comprises electrodes capable of being electrically biased to couple energy to the effluent received in the plasma cell. A scrubbing cell is coaxially exterior to the plasma cell, and comprises a scrubbing fluid inlet to introduce scrubbing fluid into the effluent received in the scrubbing cell and a scrubbing fluid outlet. An effluent outlet is provided to release the treated effluent from the reactor.

The effluent treatment reactor may be adapted to treat effluent from a substrate processing apparatus. The substrate processing apparatus comprises a process chamber comprising a substrate support to receive a substrate, a gas supply to provide a process gas in the chamber, a gas energizer to energize the process gas to process the substrate and thereby form an effluent, and an exhaust conduit to exhaust the effluent to the effluent inlet of the effluent treatment reactor.

In another embodiment, the effluent treatment comprises coaxial inner and outer tubes, the outer tube having capped ends and extending beyond the inner tube such that the received effluent can flow from one tube to another. At least one tube comprises a dielectric having an embedded first electrode that may be electrically coupled to a second electrode about the tube, and at least one tube comprises a scrubbing fluid inlet to introduce a scrubbing fluid into the tube. A voltage source is provided to electrically bias the first and second electrodes to transfer power to the effluent to form a plasma therein to treat the effluent.

In yet another embodiment, the effluent treatment reactor comprises a pre-scrubbing cell, plasma cell and post-scrubbing cell. The pre-scrubbing cell comprises an effluent inlet to receive effluent from a process chamber, and a pre-scrubbing fluid inlet to dispense a scrubbing fluid in the received effluent. The plasma cell is adapted to receive effluent from the pre-scrubbing cell, and comprises a first cylinder having a first electrode embedded therein, a second electrode extending into the inner cylinder, and a voltage source to electrically power the first and second electrodes to form a plasma of the received effluent. The post-scrubbing cell is in the volume between the first cylinder and a second cylinder coaxially external to the first cylinder, and comprises post-scrubbing inlets to introduce scrubbing fluid into the post-scrubbing cell to treat the effluent passing therethrough, a scrubbing fluid outlet, and an effluent outlet to release the treated effluent.

An embodiment of a method of forming an electrode for an effluent treatment reactor comprises forming a hollow dielectric and embedding an electrode in the hollow dielectric.

In a further embodiment, the effluent treatment reactor comprises a scrubbing cell comprising an effluent inlet to receive the effluent from the process chamber; spaced apart effluent injector nozzles capable of injecting effluent into the scrubbing cell at directions that are tangential to a circle within the scrubbing chamber; a scrubbing fluid inlet to spray a scrubbing fluid across the path of the tangentially injected effluent to treat the effluent; a scrubbing fluid outlet; and an effluent outlet to release the scrubbed effluent.

In another embodiment, the effluent treatment reactor comprises a pre-scrubbing cell comprising effluent injector nozzles that are spaced apart from one another and capable of injecting effluent into the scrubbing cell at directions that are tangential to a circle within the pre-scrubbing cell, a scrubbing fluid inlet to spray a scrubbing fluid across the path of the tangentially injected effluent to treat the effluent, and additive gas inlets adapted to introduce an additive gas into the effluent. A plasma cell is provided to form a plasma of the pre-scrubbed effluent and additive gases. A post-scrubbing cell is provided to scrub the effluent and additive gases.

In yet another embodiment, the effluent treatment reactor comprises a scrubbing cell comprising an effluent inlet to receive the effluent from the process chamber, and a scrubbing fluid injector nozzle to impinge a scrubbing fluid stream against a fluid impingement surface to generate a scrubbing fluid mist to scrub the effluent.

In another embodiment, the effluent treatment comprise a scrubbing cell having walls, an effluent inlet to receive the effluent from the process chamber, a scrubbing fluid nozzle to introduce scrubbing fluid into the effluent, and a sonic transducer coupled to the wall of the scrubbing cell to generate sonic waves in the walls of the scrubbing cell.

In a further embodiment, the effluent treatment comprise a plasma cell comprising an internal surface with a rifling groove, an effluent inlet to receive the effluent from the process chamber, and a fluid inlet to form a fluid film on the internal surface of the plasma cell.

DRAWINGS

These and other features, aspects, and advantages of the present invention will become better understood with regard to the following description, appended claims, and accompanying drawings which illustrate examples of the invention, where:

FIG. 3 is a top view of the treatment reactors shown in FIGS. 1 and 2 showing the spacing and locations of the nozzles and gas inlets;

FIG. 4 is a perspective view of an embodiment of an effluent treatment reactor having a rifling groove (shown as a dotted line) on an inner surface of the scrubbing chamber;

FIGS. 8a through 8d are partial sectional side views of effluent treatment reactors having improved additive gas inlets;

DESCRIPTION

Effluent exhausted from a substrate processing chamber is treated by introducing the effluent into an effluent treatment reactor that causes reactions that abate the hazardous gas content of the effluent, remove particulates, and convert hazardous or toxic gases to liquids, non-corrosive materials or environmentally friendly compounds. The reactor can be adapted to convert hazardous gases, such as HAPs, VOCs, PFCs, CFCs or other halogen containing gases, into less hazardous or non-toxic gases. The reactor can also be adapted to convert the hazardous gases into materials that are easily removed from the effluent flow stream, for example by filtering or dissolving the materials. The reactor can furthermore be adapted to remove particulates and other materials from the effluent stream so that they do not clog up the water pumps and filters of the substrate processing apparatus.

Figure 1:
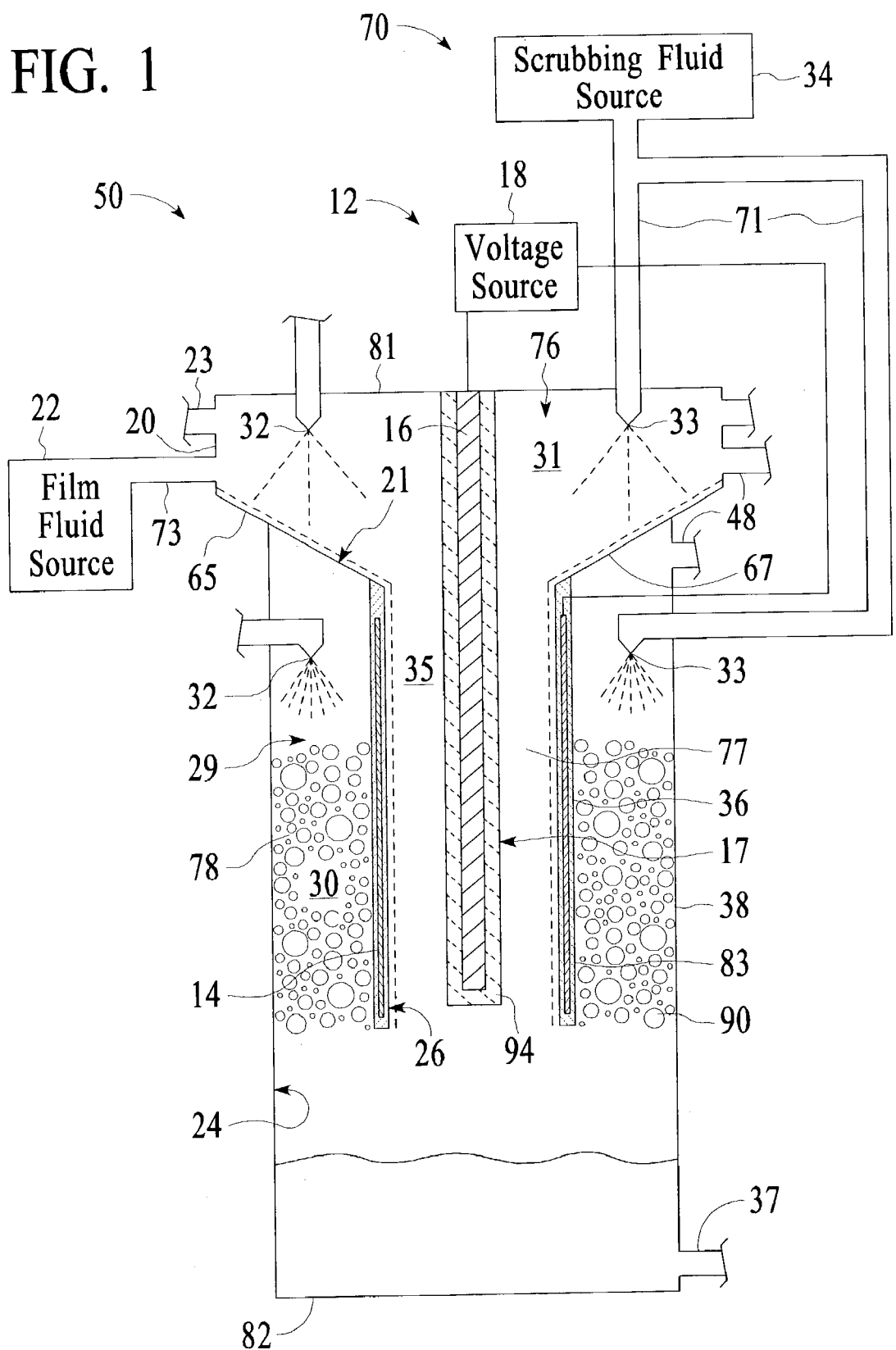
FIG. 1 is a sectional side view of an embodiment of an effluent treatment reactor comprising coaxial scrubbing and plasma cells.
Figure 2:
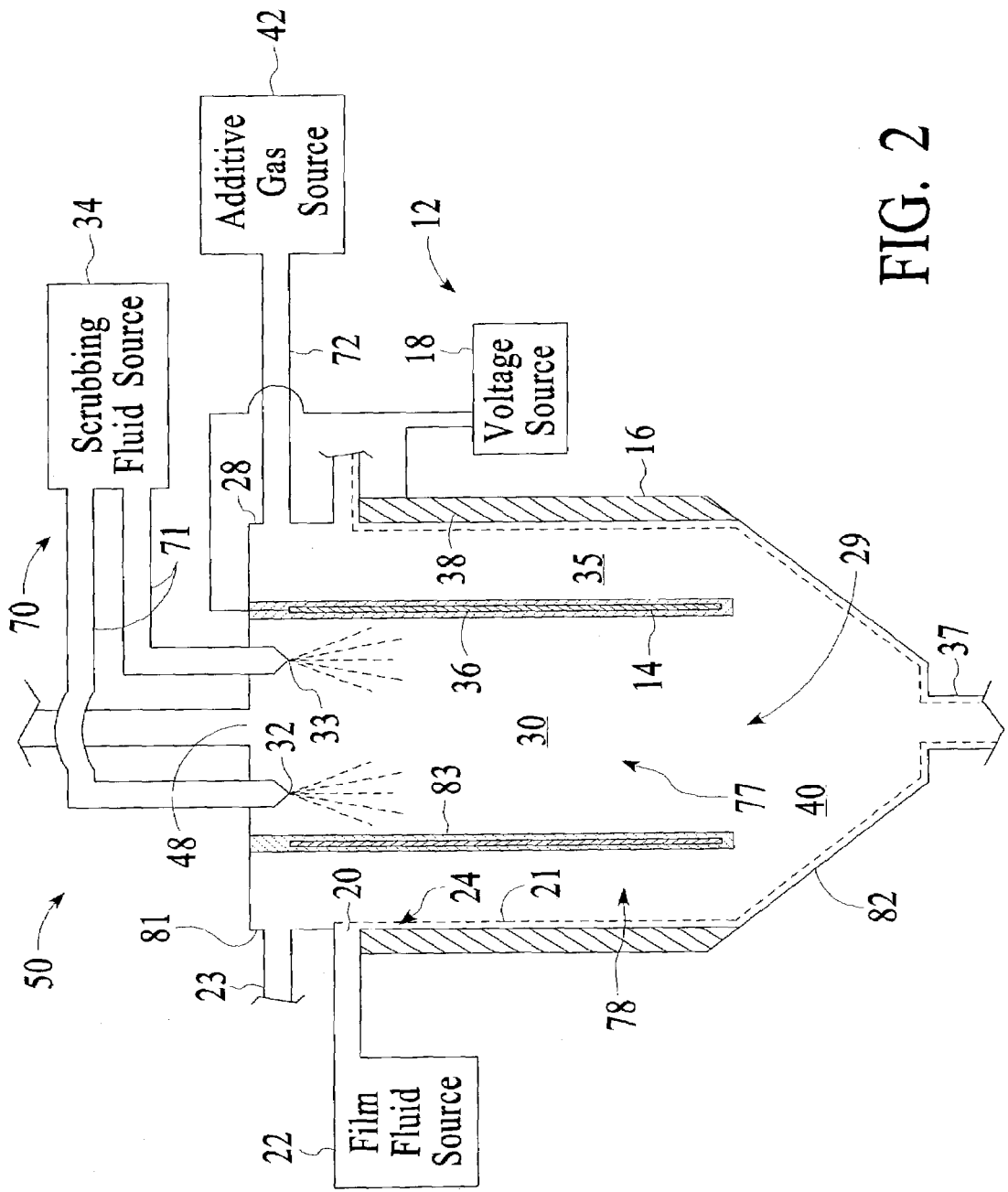
FIG. 2 is a sectional side view of another version of an embodiment of an effluent treatment reactor comprising coaxial scrubbing and plasma cells.

FIGS. 1 and 2 show embodiments of an effluent treatment reactor 50 that is capable of treating and abating the effluent. The reactor 50 comprises a plasma cell 35 to energize the effluent to form a plasma from the effluent, thereby inducing abatement reactions and other reactions in the effluent. The reactor 50 also comprises a scrubbing cell 30 to contact the effluent with a scrubbing fluid to scrub or remove unwanted particulates and hazardous components from the effluent stream. Thus, the plasma cell 35 and scrubbing cell 30 cooperate to treat the effluent to generate a treated effluent flow stream that is more easily further refined or that may be released into the atmosphere without adverse environmental effects. Optionally, the plasma may be formed while injecting a fluid such as water into the plasma. This provides a synergistic effect in which the water based plasma can more effectively treat the effluent to reduce the hazardous and toxic products therein.

The reactor 50 comprises a plasma cell 35 and a scrubbing cell 30 that are coaxially disposed to each other. The co-axial plasma and scrubbing cells 35, 30 are centered about the substantially same axis, and preferably, symmetrical about the axis as well. For example, at least a portion of the plasma cell 35 may be surrounded by the scrubbing cell 30, as shown in FIG. 1. As another example, at least a portion of the scrubbing cell 30 can be surrounded by the plasma cell 35, as shown in FIG. 2. The coaxial plasma and scrubbing cells 30, 35 are advantageous because they provide a convoluted effluent flow path through the reactor 50 with a minimum footprint. This allows for a longer effluent residence time in the reactor 50, and consequently, improved abatement of the effluent. At the same time, the coaxial cells 30,35 allow for a fairly compact shape factor thereby reducing the footprint space required for the reactor 50 in a clean room environment. However, the effluent treatment reactor 50 does not have to be used in the clean room and can also be placed in an external non-clean room environment such as a pumping room or otherwise, since the reactor can operates at atmospheric pressure and can potentially exhaust to atmosphere if the treated effluent is safe.

The coaxial plasma and scrubbing cells 35, 30 may be defined by coaxial inner and outer tubes 36,38. The tubes 36,38 comprise extended hollow passageways that are arranged to define the plasma and scrubbing cells 35,30. In the version shown in FIG. 1, the inner tube 36 forms a common wall between the scrubbing and plasma cells 30,35 that at least partially surrounds and defines an inner passage 77 comprising the plasma cell 35, while the outer tube 38 is spaced apart from the inner tube 36 to define an outer passage 78 comprising the scrubbing cell 30 in the volume therebetween. Alternatively, in the version shown in FIG. 2, the inner tube 36 forms a common wall between the scrubbing and plasma cells 30,35 that partially surrounds and defines an inner passage 77 comprising the scrubbing cell 30, while the outer tube 38 is spaced apart from the inner tube 36 to define an outer passage 78 comprising the plasma cell 35 therebetween. The tubes 36,38 comprise a cross section that is suitable for the flow of effluent through the treatment reactor 50, such as for example, a round, rectangular, triangular or other shape or combination of shapes. For example, in the versions shown in FIGS. 1 and 2, the tubes 36,38 comprise concentric cylinders having a substantially circular cross-section that defines concentric cylindrical plasma and scrubbing chambers 35,30. The outer tube 38 may further extend beyond the inner tube 36 and comprise capped upper and lower ends 81,82, to define an effluent passageway 40 that facilitates flow of the effluent between the cells.

The shape and size of the reactor 50 is selected to suitably abate a predefined flow rate of effluent flowing into the reactor 50 out from the substrate processing chamber 106. The effluent can be introduced into the effluent treatment reactor 50 by effluent inlets 23 located upstream of the plasma cell 35. The effluent introduced into the reactor 50 flows through the plasma cell 35 and undergoes abatement reactions induced by the plasma formed in the plasma cell 35. The plasma treated effluent flows through the gas passageway 40 and into the scrubbing cell 30 where the effluent is scrubbed before the treated effluent is released from the reactor 50 via the effluent outlet 48 located downstream of the scrubbing cell 30. In the version shown in FIG. 1, the effluent is introduced through the effluent inlets 23 and flown into a coaxially interior plasma cell 35. The reactor 50 comprising the coaxially interior plasma cell 35 and external scrubbing cell 30 has been discovered to provide advantages such as better electrical isolation of high voltage flow lines in the reactor 50, thus inhibiting short circuiting in the reactor 50. Alternatively, the effluent may be introduced into the internal scrubbing cell 30 before being introduced into the external plasma cell 35, or the positions of the plasma cell 35 and scrubbing cell 30 may be switched and the effluent may be introduced into the cells 30,35 in another suitable order.

The scrubbing cell 30 is adapted to treat the effluent by providing a scrubbing fluid to scrub or remove particulates and unwanted materials from the effluent, and/or to add reactive species to the effluent to react with and abate the effluent. The scrubbing fluid can also dissolve or react with materials in the effluent as the effluent travels through the scrubbing cell 30. For example, a scrubbing fluid comprising water may be introduced into an effluent comprising HF to dissolve the HF in the scrubbing fluid and remove the HF from the effluent stream. The scrubbing fluid can also remove solid particulates, such as $SiO_2$, from the effluent stream. The scrubbing fluid is provided to the scrubbing cell 30 by a scrubbing fluid distributor 70 comprising one or more scrubbing fluid inlets 32 connected to a scrubbing fluid source 34 by scrubbing fluid conduits 71. The scrubbing fluid distributor 70 comprises inlets 32 having nozzles 33 adapted to spray scrubbing fluid into the effluent stream in the scrubbing cell 30. The scrubbing fluid inlets 32 and nozzles 33 can be adapted to spray scrubbing fluid in a direction that is against or across a flow direction of the effluent flow stream, to better scrub the effluent. The scrubbing cell 30 can also optionally comprise scrubbing beads arranged in the scrubbing cell 30, as shown in FIG. 1, that are soaked or coated in scrubbing fluid to provide a larger scrubbing surface contact area. The scrubbing fluid used to scrub the effluent is removed from the reactor 50 via a fluid outlet 37 located near the bottom of the reactor 50.

The scrubbing cell 30 can comprise a pre-scrubbing cell 31 through which the effluent is passed prior to treatment in the plasma cell 35. The pre-scrubbing cell 31 serves to remove unwanted particulates before the effluent is introduced into the plasma cell 35, as well as to add gas or fluid additives, such as reactive gas additives, that can be energized with the effluent in the plasma cell 35 to abate the effluent. The scrubbing cell 30 can also comprise a post-scrubbing cell 29 that is adapted to scrub the effluent after treatment in the plasma cell 35. The post-scrubbing cell 29 is adapted to dissolve or wash away particulates and other unwanted materials, such as the above described HF and $SiO_2$, that may be formed as products of the plasma cell treatment. The reactor 50 can also comprise both a pre-scrubbing cell 31 and post-scrubbing cell 29 to scrub the effluent before and after treatment in the plasma cell 35, as shown for example in FIG. 1.

In one exemplary version, the pre-scrubbing cell 31 is disposed above one or more of the plasma and post-scrubbing cells 35,30 and is defined by a volume between the upper capped end 81 of the reactor 50 and a sidewall of the reactor 50 that cooperate to form an upper passage 76 comprising the prescrubbing cell 31 therebetween. For example, in the embodiment shown in FIG. 1, the pre-scrubbing chamber is defined by an annular sidewall 65 that is connected to an inner tube 36 surrounding an interior plasma cell 35 to allow a flow of effluent between the pre-scrubbing cell 31 and interior plasma cell 35. The annular sidewall 65 can be connected to the inner tube 36 via a ledge 67 that is sloped to connect to the top of the inner tube 36. The annular sidewall 65 comprises a suitably sized circumference that may be greater than that of the inner and outer tubes 36,38, or that may be smaller than one or more of the tubes 36,38 depending on size and effluent flow requirements. For example, the annular sidewall 65 can comprise a circumference that is greater than that of the inner tube 36, and the sloped ledge 67 of the annular sidewall 65 can form at least a portion of a top wall of the post-scrubbing cell 30, as shown in FIG. 1.

The reactor 50 may optionally comprise a source of additive gas (in addition or as an alternative to the optional pre-scrubbing cell 30) that provides a reactive gas capable of reacting with components of the effluent to reduce the hazardous gas content of the effluent. Desirably, the additive gas is added into the effluent either before or in the plasma cell 35 so the additive gas can be energized to form energized species in the plasma cell 35 that react with and abate the effluent. In one version, a suitable additive gas comprises a reducing agent, such as for example one or more of $H_2$, $H_2O$, $NH_3$, $C_2H_4$, $CH_4$ and $C_2H_6$. In another version, the additive gas comprises an oxidizing agent, such as for example one or more of $O_2$, $O_3$, and $C_2H_3OH$. The additive gas can be provided in the reactor 50 by an additive gas inlet 28 adjacent to the plasma cell 35 that is coupled to an additive gas source 42 by an additive gas conduit 72, as shown in FIGS. 1 and 3. The additive gas inlet 28 can also provide a non-reactive gas from the additive gas source 42, such as for example one or more of Ar, He, and Xe. By additive gas it is meant both gases and vaporized liquids.

The plasma cell 35 can treat the effluent by energizing the effluent and/or additive gas to form a plasma in the cell 35. The effluent and/or additive gas can be energized in the plasma cell 35 to form energized plasma species that initiate abatement reactions in the effluent to reduce a hazardous gas content of the effluent. Some examples of these abatement reactions are shown in equations 1 through 17.

Examples of dissociation and chemical abatement reactions for the treatment of effluent comprising $F_2$ in the presence of an additive comprising $H_2O$ are:

1) $H_2O + e^- \Rightarrow H + OH + e^-$
2) $F_2 + e^- \Rightarrow F + F + e^-$
3) $F_2 + H \Rightarrow HF + F$      fast, $2.0 \times 10^{-12}$ cm³/s
4) $H_2O + F \Rightarrow HF + OH$      fast, $1.4 \times 10^{-11}$ cm³/s
5) $2OH \Rightarrow H_2O_2$      fast, $3.0 \times 10^{-11}$ cm³/s -continued 6) $H_2O_2 + F \Rightarrow HF + HOO$      fast, $5.0 \times 10^{-11}$ cm³/s Fast indicates that the reaction occurs quickly and with the indicated gas volumes. Thus, the plasma formed from the effluent comprising $F_2$ and additive comprising $H_2O$ results in the activation of fluorine and water molecules to generate atoms and radicals, which react with molecular fluorine to produce HF. Accordingly, in one version, fluorine-containing molecules, such as $F_2$, may be treated by providing an additive comprising $H_2O$ without the addition of any other additive.

Examples of abatement reactions for the treatment of effluent comprising $F_2$ in the presence of additives comprising $H_2$ and $H_2O$ are:

7) $e^- + F_2 \Rightarrow F + F$
8) $e^- + H_2 \Rightarrow H + H + e^-$
9) $H + F_2 \Rightarrow HF + F$
10) $F + H_2O \Rightarrow HF + OH$
11) $OH + H_2 \Rightarrow H_2O + H$ Thus, the plasma formed from the effluent comprising $F_2$ and additives comprising $H_2$ and $H_2O$ yields a reduction reaction in which $F_2$ is reduced by hydrogen radicals into HF.

Other possible abatement reactions involving the reduction of hazardous gases are:

12) $CFCs + H_2 \Rightarrow HF + HCl +$ completely or partially dehalogenated hydrocarbons
13) $H_2 + SiF_4 \Rightarrow HF +$ silane or fluorosilanes
14) $CCl_4 + H_2 \Rightarrow HCl$, methane and chloromethane Examples of possible abatement reactions involving the addition of both oxidating and reducing agents to the effluent to abate hazardous gas compounds are:

15) $CFCs + H_2 + O_2 \Rightarrow HF + CO_2 + H_2O + HCl$
116) $SiF_4 + H_2 + O_2 \Rightarrow HF + H_2O + SiO_2$
11) $CCl_4 + H_2 + O_2 \Rightarrow HCl + H_2O + CO_2$ Thus, by energizing the effluent and/or additive in the plasma cell, hazardous gases in the effluent can be chemically converted into less dangerous gases, or materials that can be easily scrubbed. For example, HF and HCl can be scrubbed and removed from the effluent flow stream by dissolving the compounds in a scrubbing fluid in the scrubbing cell 30. As another example, $SiO_2$ can be removed from the effluent flow stream by scrubbing or filtering the effluent in the scrubbing cell 30 and removing via the outlet 37.

The effluent gas can be energized in the plasma cell 35 to form a non-thermal plasma which has energized species that are at different temperatures. In contrast, a "thermal" plasma has energized species that are at roughly about a same high temperature in the thousands of degrees Kelvin. Non-thermal plasmas, such as those formed at atmospheric pressure, often have rapidly propagating micro-streamers, similar to micro electrical arcs, that are generated and terminated in rapid succession without forming a steady and sustained plasma. To generate a non-thermal plasma, electromagnetic power is coupled to the effluent gas to form the micro-streamers. Because the non-thermal plasma is generated at or near ambient temperatures, the non-thermal plasma can reduce the levels of corrosion of the reactor 50 that would otherwise occur at the high temperatures. The micro-streamers formed in the non-thermal plasma also release less heat than a sustained thermal plasma, and thus reduces the levels of corrosion of the reactor 50. Examples of non-thermal plasma generating systems include, for example, dielectric barrier discharge chambers, corona discharge chambers, and pulsed-DC chambers.

The effluent can be energized to form a non-thermal plasma in the plasma cell 35 by a dielectric barrier discharge energizer 12, such as a film discharge gas energizer. The dielectric barrier discharge gas energizer 12 comprises one or more electrodes 14, 16 about the plasma cell 35. In the version shown in FIG. 1, the dielectric barrier discharge gas energizer 12 comprises a first electrode 14 about the inner tube 36 and a second electrode 16 that extends into the volume defined by the inner tube 36. The dielectric barrier discharge gas energizer 12 can also comprise a first electrode 14 about the inner tube 36 and a second electrode 16 about the outer tube 38, as shown in the version of FIG. 2. One or more of the first and second electrodes 14, 16 are coupled to a voltage source 18, such as an AC voltage source that provides a voltage that is sufficiently high to bias the electrodes 14, 16 to energize the effluent. The voltage source 18 may be adapted to provide a voltage of at least about 10 kV, for example from about 10 kV to about 60 kV, and even about 30 kV.

The reactor 50 can also include a fluid film inlet 20 to flow a fluid over surfaces in the reactor 50, such as over the surface of at least one of the electrodes 14,16 to form a fluid film over the electrodes 14, 16. In the version shown in FIG. 1, the inner tube 36 comprises a first electrode 14 and the fluid film inlet 20 provides fluid that flows by gravity over an inner surface 26 of the inner tube 36, thereby at least partially covering the first electrode 14. The power coupled between the first and second electrodes 14,16 through the overlying fluid film to the effluent generates the non-thermal plasma micro-streamers in the cell 35. In one version, the fluid film is provided by the scrubbing fluid distributor 70. In this version, as shown in FIG. 3, the fluid film inlet 20 is connected to the scrubbing fluid source 34 via a fluid film conduit 73. In another version, as shown in FIG. 1, the fluid film inlet 20 is connected via the fluid film conduit 73 to a separate fluid film source 22. The fluid film inlet 20 may be located in the pre-scrubbing chamber 31, as shown in FIG. 1, or in the plasma chamber 35, as shown in FIG. 2. Spent fluid film is removed from the reactor 50 via the fluid outlet 37. A fluid film suitable for the dielectric barrier discharge gas energizer 12 comprises, for example, one or more of $H_2O$, $H_2O_2$ and $CH_2O$ solutions.

The fluid film provided in the reactor 50 has several advantages. For example, the fluid film can absorb heat generated in an abatement reaction, thereby reducing the temperature of the surfaces in the reactor 50, and consequently, reducing corrosion of these surfaces. Additionally, the fluid film can also serve as a source of additive fluid or gas for plasma abatement. The energized species and/or heat generated by the non-thermal plasma may vaporize portions of the fluid film to form gaseous reactive additives that enter the effluent gas flow stream. Furthermore, the fluid film also removes the particulates formed in an abatement reaction from the effluent stream. In the version shown in FIG. 1, the fluid film is formed over a first electrode 14 that is embedded in a dielectric wall 83 that forms at least a portion of the inner tube 36, to protect the first electrode 14.

A rifling groove 210 can be provided on an inner surface 24,26 of one or more of the inner and outer tubes 36,38, as shown in FIG. 4, to draw scrubbing fluid into the groove 210. The fluid inlet 20 can be positioned at an inlet 212 of the rifling groove 210 to flow the fluid into rifling groove. The rifling groove 210 draws the fluid into the groove to control the flow path of the fluid along the inner surface of the tube, such as along the inner surface 24 of the inner tube 36. The rifling groove 210 can also allow the fluid to flow along the inner surface 26 of the tube 36 to form a fluid film with a more uniform thickness. The rifling groove 210 can be cut into the inner surface 26 of the tube 36 so that ridges are formed between the rifling grooves 210. In one configuration, the rifling groove 210 extends along substantially the entire length of the inside surface 26 of the tube 36. In one version, the rifling groove 210 is cut as helical groove that spirals down from the top end 216 of the tube 38 near the fluid inlet 20 to the bottom end 218 of the tube 38. In one version, the spiral is at an angle ranging from about 15 to about 85 degrees from the vertical. However, other rifling groove angles or different rifling patterns may also be used, such as for example, a pattern of straight or tangential parallel lines, a checker board pattern, and a mesh with diamond shaped cutouts.

One or more of the inner and outer tubes 36, 38 comprises a dielectric wall 83 having the electrode embedded therein. The dielectric wall 83 may form only a portion of the inner or outer tube 36,38 or the tube 36,38 may be substantially entirely made from dielectric material with an electrode embedded therein. In the version shown in FIG. 1, the first electrode 14 is embedded in a dielectric wall 83 that forms at least a portion of an inner tube 36 defining the plasma cell 35, and is electrically coupled to a second electrode 16 that extends into the interior of the plasma cell 35. In the version shown in FIG. 2, the first electrode 14 is embedded in a dielectric wall 83 that forms at least a portion of an inner tube 36 defining the scrubbing cell 30, and is electrically coupled to a second electrode 16 comprising a metallic tube that forms at least a portion of the outer tube 38 (as shown). The dielectric wall 83 forms a common wall between the plasma and scrubbing cells 35,30 and protects the embedded first electrode 14 from erosion by energized effluent species and other materials in the plasma and scrubbing cells 35,30. Embedding the electrode 14 in the dielectric wall 83 can also inhibit arcing between the first and second electrodes 14,16 while still allowing electromagnetic energy to be transmitted through the dielectric wall 83 to generate the plasma in the plasma cell 35.

The dielectric wall 83 can be made of dielectric material comprising a ceramic or polymer, such as for example one or more of Teflon™ a fluoropolymer available from DuPont de Nemours, Wilmington, Del.; aluminum oxide, silicon oxide, aluminum nitride, yittrium oxide, doped ceramics, aluminum carbide, silicon carbide and composite materials. Desirably, the thickness of the dielectric material in the dielectric wall 83 covering the first electrode 14 is sufficiently thick to protect the electrode 14 from corrosion but sufficiently thin to allow electrical power to couple through the dielectric wall 83 to form the plasma. For example, the thickness of the dielectric material covering the first electrode 14 may be at least about 1 mm, for example from about 1 mm to about 5 mm.

Figure 5C:
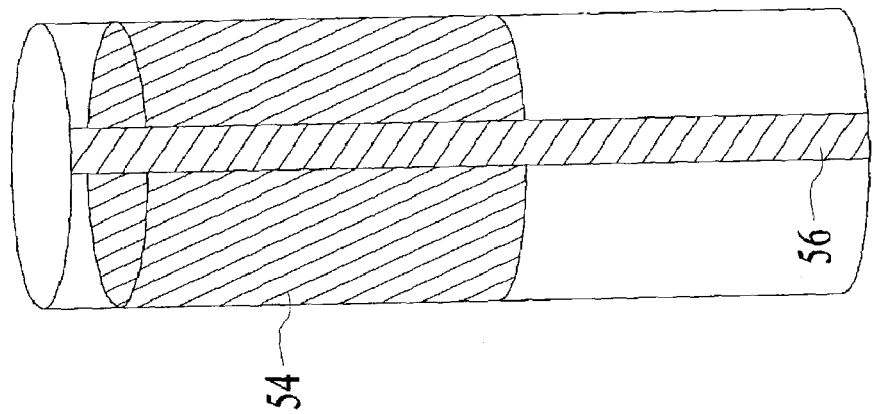
FIGS. 5a through 5c are sectional side views of embodiments of embedded electrodes that provide different surface distributions of power coupled to the effluent.
Figure 5B:
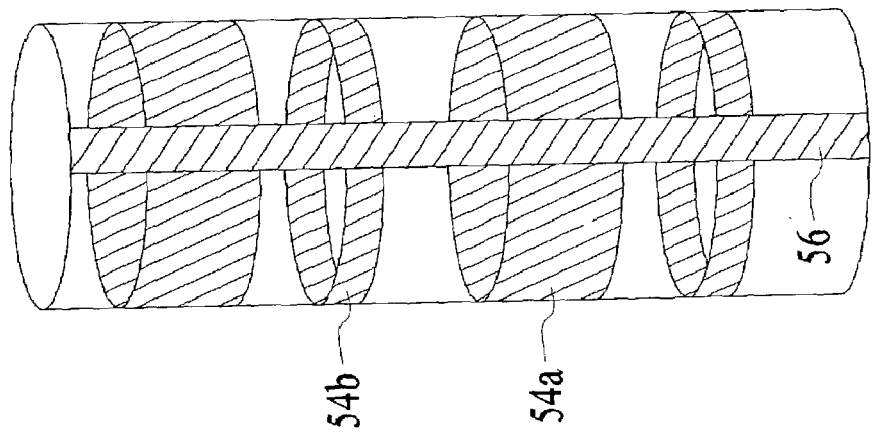
Figure 5A:
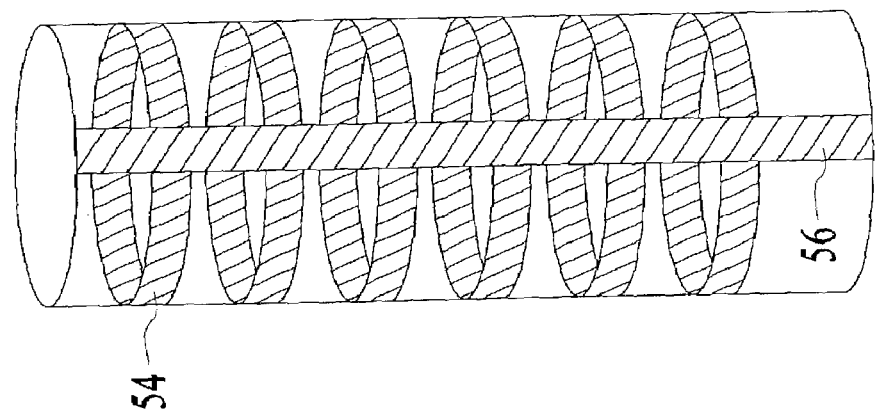

The embedded electrode 14 comprises a shape and size that is suitable for generating the plasma in the plasma cell 35. For example, the embedded electrode 14 can comprise planar sheets, rods, or rings of conductive material embedded in the dielectric wall 36. In the version shown in FIGS. 5a through 5c, the embedded electrode 14 comprises one or more rings 54 that are spaced apart along a longitudinal axis of the dielectric wall 36. The rings 54 are electrically connected together by one or more connector strips 56 that are coupled to the voltage source 18 to provide current to each of the rings 54. FIG. 5a shows an embedded electrode 14 having series of rings 54 with about the same width. FIG.

5b shows an electrode 14 comprising a combination of first rings 54a and second rings 54b that have a smaller width than the first rings 54b. FIG. 5c shows an electrode 14 having a single ring 54. The width and distribution of the rings 54 are selected to control the surface energy distribution of the power coupled to effluent in the plasma cell 35. A first ring 54a having a width that is larger than the width of a second ring 54a can couple a power level to the effluent that is higher than the power level coupled by the second ring 54b. Thus, the distribution of energy coupled to the effluent can be selected or optimized using different shapes or widths of the ring 54.

A method of forming the dielectric wall 36 having the embedded electrode 14 will now be described, with reference to FIGS. 6a though 6c. In this version, a hollow dielectric 206 is formed and the electrode 14 is embedded in the hollow dielectric 206. The hollow dielectric 206 may comprise first and second dielectric housings 200 and 202 that encase one another and have the electrode 14 embedded therebetween. The hollow dielectric housings 200, 202 may be formed from the aforementioned dielectric materials.

Figure 6A:
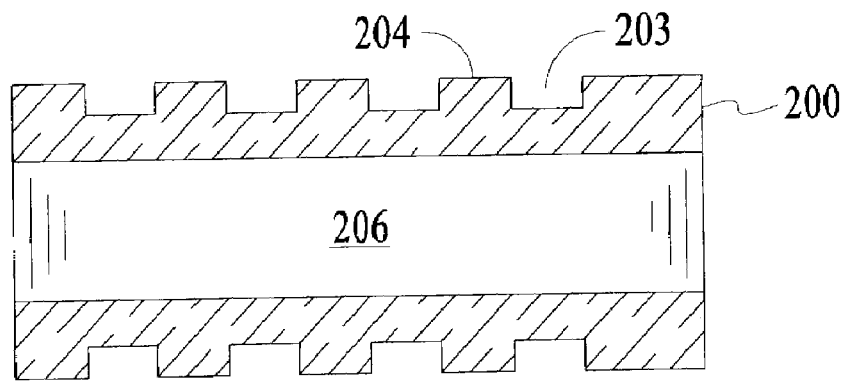
FIG. 6a is a sectional side view of a tube made from dielectric and having grooves machined in an outer surface.
Figure 6B:
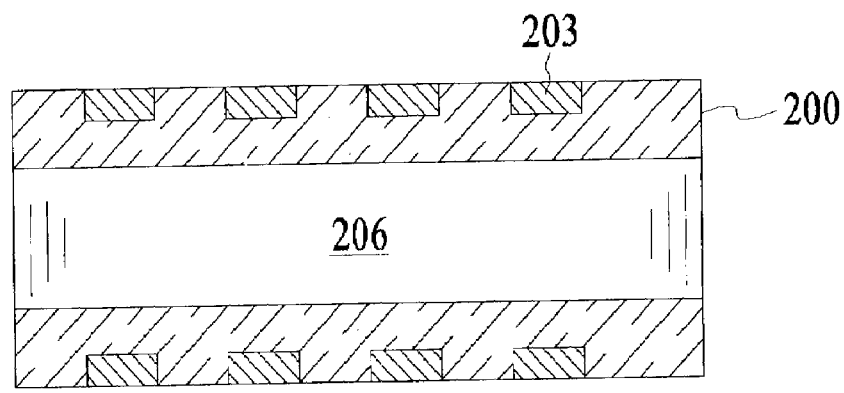
FIG. 6b is a view of the housing of FIG. 6a showing an electrode formed in the groves.
Figure 6C:
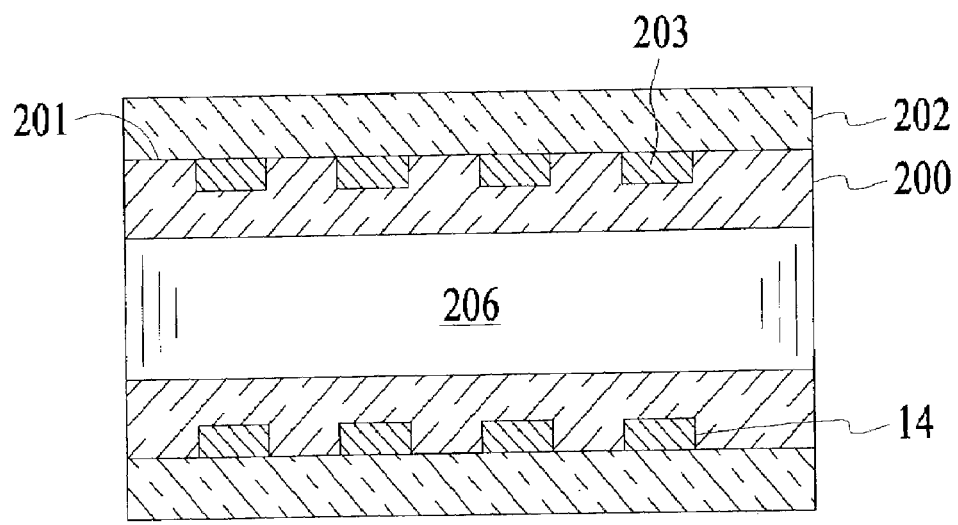
FIG. 6c is a view of the dielectric housing and electrode of FIG. 6b encased in another dielectric housing.

In one version, the first hollow dielectric housing 200 is formed and grooves 203 are machined into an outer surface 204 of the housing 200, as shown in FIG. 6a. The grooves 203 in the hollow dielectric housing 200 are provided to accommodate the embedded electrode 14, and thus are formed in relation to the desired electrode size and shape. For example, the grooves are shaped and sized to accommodate electrode rings 54 having desired widths. Once the first hollow dielectric housing 200 having the grooves 203 is formed, the electrode 14 is formed within the grooves 203, as shown in FIG. 6b. For example, metal pieces having the desired shape can be placed in the grooves 203 to form the electrode 14, a metal powder can be used, or molten metal can be poured in the grooves 203 and cooled to form the electrode 14. Metals that are suitable for forming the electrode 14 can comprise, for example, one or more of aluminum, copper, gold, molybdenum nickel, platinum, silver, titanium and tungsten. After forming the electrode 14 the first hollow dielectric housing 200 is encased in a second hollow dielectric housing 202, as shown in FIG. 6c, thereby embedding the electrode 14 between the first and second housings 200, 202. The second hollow dielectric housing 202 desirably comprises a dielectric material that is the same as the dielectric material of the first hollow dielectric housing 200 to reduce the occurrence of thermal expansion mismatch between the housings 200, 202, however the second hollow dielectric housing 202 can also comprise a different material. Additionally, the second housing 202 can be bonded to the first housing 200 and electrode via application of a bonding material at the interface 201 between the housings 200, 202 prior to encasing the first housing 200 in the second housing 202. The bonding material helps form a tighter bond and reduce the formation of air gaps between the first and second housings 200, 202. Suitable bonding materials comprise, for example, one or more of aluminum oxide powder suspended in a slurry of a binder or polymer material. The embedded electrode assembly comprising the housings 200, 202 and electrode 14 can also be fired by heating of the assembly after encasing of the first housing 200 within the second housing 202 to bond the first housing 200 to the second housing 202.

In another method of forming the dielectric wall 36 having the embedded electrode 14, a hollow dielectric shape is formed and a desired electrode configuration is painted or printed on the dielectric shape (not shown). For example, a pattern of electrode rings similar to those shown in FIGS. 5a through 5c may be formed by screen printing a slurry comprising a composition of particulate metal suspended in a solvent onto the surface of the dielectric shape. After forming the electrode, optionally, the electrode may be covered by a dielectric layer.

The reactor 50 comprising the coaxially interior plasma cell 35 and exterior scrubbing cell 30, as shown in FIG. 1, further comprises a second electrode 16 that extends a sufficient length into the volume of an interior plasma cell 35 to energize a desired volume of effluent gas in the plasma cell 35. In this version, the second electrode 16 extends from the upper capped end 81 of the reactor 50 through the pre-scrubbing cell 31 and into the plasma cell 35, and is at least partially surrounded by the inner tube 36 comprising the embedded first electrode 14. The second electrode 16 comprises a rod-shaped metal electrode or other metallic structure suitable to couple energy to the effluent in the plasma cell 35. The second electrode 16 can also be at least partially embedded in a dielectric cover 94 that protects the embedded second electrode 16 by inhibiting corrosion of the embedded electrode and by reducing arcing between the first electrode 14 and second electrode 16. The spacing between the second electrode 16 and first electrode 14 and the thickness of the dielectric cover 94 covering the second electrode 16 are selected to coupling a desired power level to the effluent gas in the plasma cell 35. For example, a suitable spacing between the first and second electrodes 14, 16 may be from about 1 mm to about 10 mm, such as about 5 mm, to couple a power level of from about 50 Watts to about 5 kWatts to the effluent in the plasma cell 35. A suitable thickness of the dielectric cover 94 may be from about 0.5 mm to about 10 mm, such as about 3 mm. The dielectric cover 94 may comprise a suitable dielectric material, such as a ceramic or polymer, such as for example one or more of Teflon™ a fluoropolymer available from DuPont de Nemours, Wilmington, Del.; aluminum oxide, aluminum nitride, yttrium oxide, doped ceramics, aluminum carbide, silicon carbide, silicon dioxide and composite material The reactor 50 can further comprise a pre-scrubbing cell 31 having improved effluent inlets 23 that are adapted to improve the scrubbing and abatement efficiency of the reactor 50. In the version shown in FIG. 3, the pre-scrubbing cell 31 comprises an annular sidewall 65 having an outer circle 84 and effluent gas inlets 23 comprising effluent gas nozzles 85 that are spaced apart along the outer circle 84, the effluent gas nozzles 85 being adapted to inject the effluent gas into the pre-scrubbing cell 31 at directions that are tangential to the circle 84. The nozzles 85 can inject the effluent gas into the pre-scrubbing chamber 31 such that the effluent is directed against the inside surface 21 of the annular wall 65 in the annular pre-scrubbing cell 31, thereby forming an effluent gas flow path having a circular component defined by the curved annular sidewall 65. The tangentially directed effluent may even form an effluent flow path in the pre-scrubbing chamber 31 that is substantially circular. By directing the effluent tangentially into the pre-scrubbing cell 31, the residence time of the effluent in the pre-scrubbing cell 31, and even in the plasma cell 35 is increased, thereby allowing for enhanced scrubbing and plasma abatement of the effluent. The injection nozzles 85 can be positioned at the end of effluent gas exhaust conduits 177 that are tangentially connected to the pre-scrubbing cell 31 along the outer circle 84 and that lead from the process chamber 106 to the reactor 50.

The fluid film inlet 20 adapted to form a fluid film over surfaces in the reactor 50 can also be positioned in the pre-scrubbing cell 31. Locating the fluid film inlet 20 in the pre-scrubbing cell 31 allows for the fluid film to scrub the effluent in the pre-scrubbing cell 31 to remove undesirable materials before the effluent is introduced into the plasma cell 35, as well as to add reactive additives from the fluid film to the effluent gas. In one version, the fluid film inlet 20 comprises an annular slit located beneath the effluent inlets 23 along annular sidewall 65 of the pre-scrubbing cell 31. The fluid film inlet 20 may also be a series of holes that are positioned adjacent to one another. Fluid film entering the pre-scrubbing cell 31 from the fluid film inlet 20 flows by force of gravity over the surface 21 of the annular wall 65 of the pre-scrubbing cell and over surfaces in the plasma cell 35. In the version shown in FIG. 1 the fluid flows from the pre-scrubbing cell 31 into an interior plasma cell 35 and over the inner surface 26 of the inner tube 36 comprising the embedded first electrode 14. The annular slit allows for a more uniform fluid film to be formed over the surface by allowing the fluid film to be flown over a larger area of the surface. The fluid film inlet 20 may be even be adapted to direct the fluid into the pre-scrubbing cell 31 in a fluid flow path having a circular component to form a rotating fluid film, thereby improving the uniform coverage of the fluid film on the surfaces in the pre-scrubbing cell and plasma cell 35.

Figure 7A:
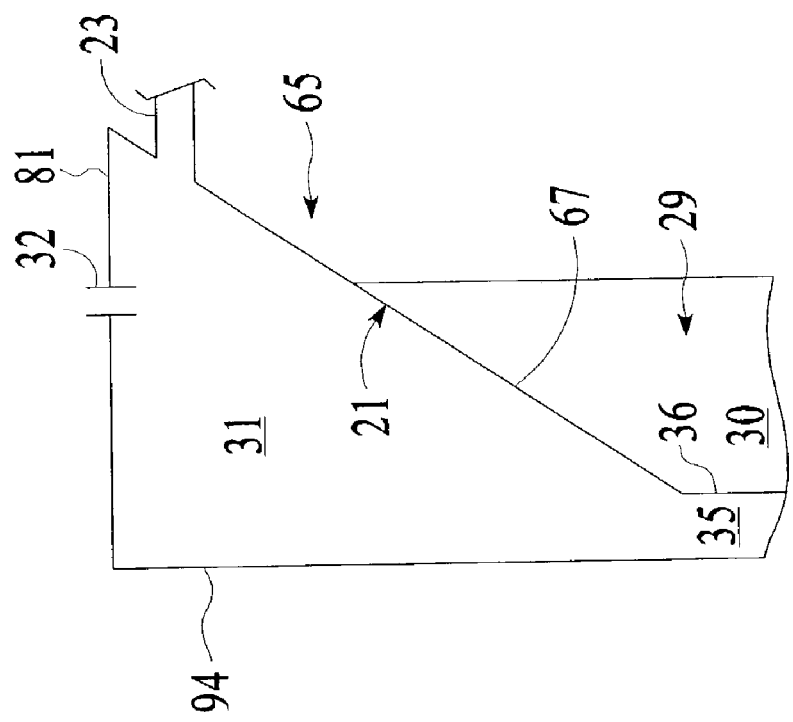
FIGS. 7a and 7b are partial sectional side views of pre-scrubbing chambers having trapezoidal and triangular cross-sections, respectively.
Figure 7B:
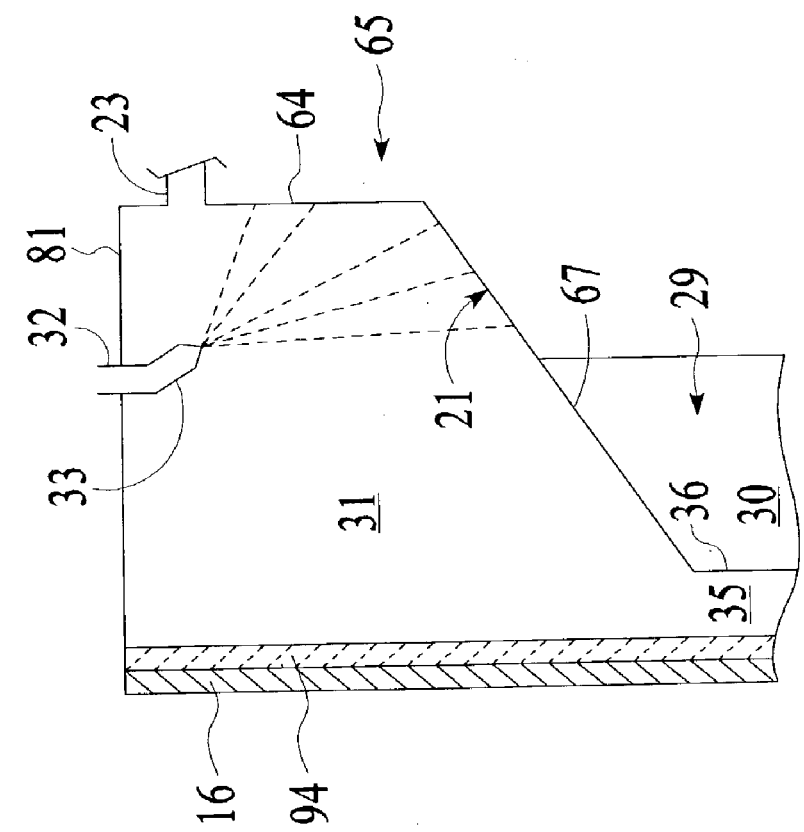

The pre-scrubbing cell 31 further desirably comprises a shape and size that are suitable to provide a good flow of effluent through the scrubbing cell 31 and optimal scrubbing of the effluent. In one version, as shown in FIG. 7a, the pre-scrubbing cell 31 comprises a cross-section having a more trapezoidal shape, as defined by the capped end 81 of the reactor 50, the dielectric cover 94 covering the second electrode 16, and the annular wall 65. In this version, the annular wall 65 comprises a straight wall portion 64 as well as the sloped ledge 67 that form sides of the trapezoid. Alternatively, the trapezoidal shape could be defined by the capped end 81, annular wall and inner tube 36, for a reactor 50 comprising a pre-scrubbing chamber upstream of an external plasma cell 35. The pre-scrubbing cell 31 comprising the trapezoidal cross-section has been discovered to have improved effluent and scrubbing fluid flow characteristics due to the wider space provided about the effluent and scrubbing fluid inlets, 23,28, and thus allows for good scrubbing of the effluent. The more gently sloped ledge 67 of the pre-scrubbing cell 31 having the trapezoidal cross-section also allows for a less turbulent introduction of the fluid film flowing along the surface 21 of the sloped ledge 67 into the plasma cell 35. Alternatively, the pre-scrubbing cell 31 may comprise a cross-section having a more triangular shape. In the version shown in FIG. 7b, sloped ledge 67 extends along substantially the entire length of the annular sidewall 65, from the capped end 81 of the reactor 50 to the top of the inner tube 36 to form a triangular shape. The pre-scrubbing cell 31 having the more triangular cross-section and smoothly sloping annular sidewall 65 can reduce the build-up of particulates in the pre-scrubbing cell 31 due to the substantial absence of recessed corners along the sloped annular sidewall 65 that could otherwise trap particulates.

Figure 8B:
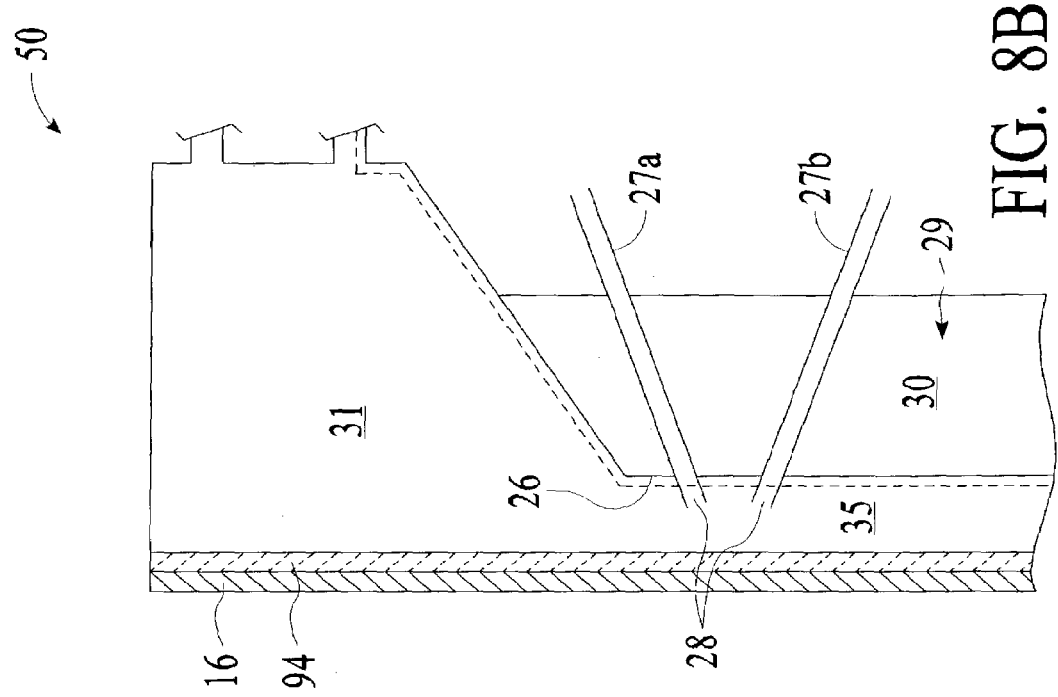
Figure 8A:
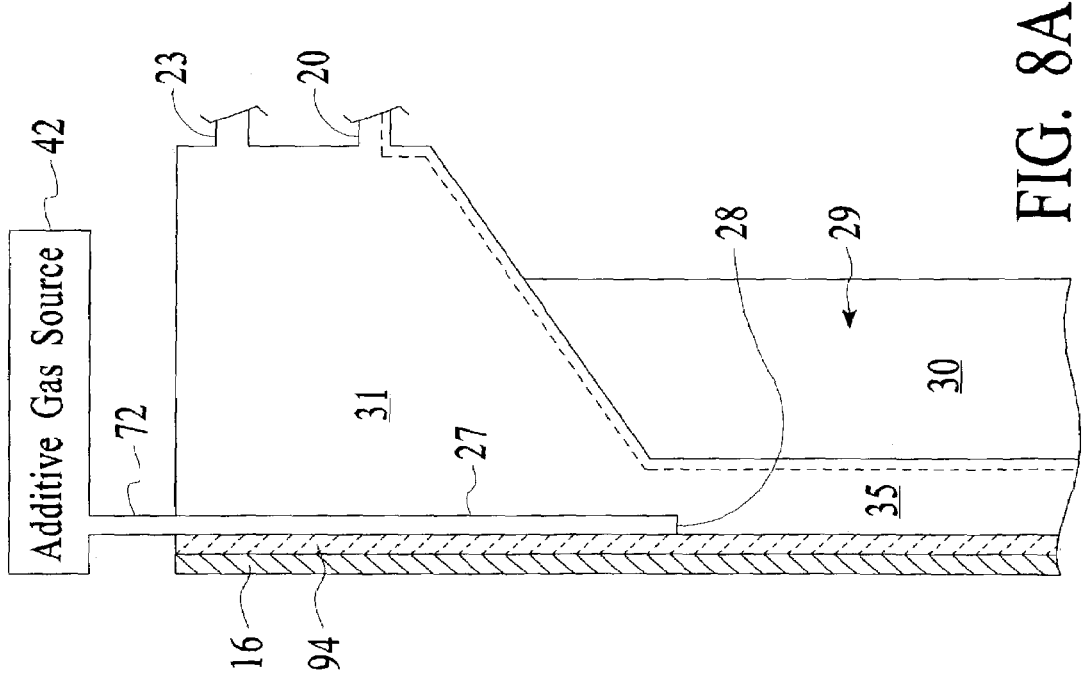

Improved additive gas inlets 28 can also be provided that are adapted to introduce additive gas into the reactor 50 in manner that controls the reaction between the additive gas and effluent gas to reduce erosion of surfaces in the reactor 50 from overly energetic and even explosive reactions between the additive gas and the effluent gas. In one version, the reaction is controlled by introducing the additive gas into the reactor 50 at a region that is downstream of the effluent gas inlets 23. For example, the additive gas inlets 28 can be located in a region in the pre-scrubbing cell 31 that is downstream of the effluent inlets 23, or in the downstream plasma cell 35, as shown in FIG. 8a. The additive gas is introduced downstream of the effluent inlets so the effluent gas can be adequately scrubbed before the additive gas is mixed into the effluent. Also, introducing the additive gas downstream of the effluent gas inlets 23 maintains energetic reactions between the additive gas and effluent gas in a region close to or in the plasma cell 35 and inhibits "backfiring" of the reactions into the pre-scrubbing cell 31. This design can be particularly advantageous in the case of the abatement of fluorine containing compounds such as $F_2$ with an additive gas comprising $H_2$, which can result in a highly exothermic reaction that can damage chamber components if not controlled. In one version, the reactor 50 comprises a plurality of spaced apart additive gas inlets 28 at the end of long tubes 27 that extend into the reactor 50 to a region downstream of the effluent inlets 23, as shown in FIGS. 8a and 8b.

The reactor 50 can also comprise a plurality of additive gas inlets 28 located in the plasma cell 35 to introduce the additive gas directly into the plasma cell 35, thereby maintaining the energetic reactions in the plasma cell 35. For example, as shown in FIG. 8b, the additive gas inlets 28 may comprise spaced apart holes in the inner tube 36 defining the plasma cell 35 through which the additive gas is introduced. Introducing the additive gas into the plasma cell 35 reduces the incidence of "backfiring" of any chemical reactions into the pre-scrubbing cell 31, thereby reducing the corrosion of the surfaces of the reactor 50. The additive gas inlets 28 may be at the end of tubes 27a,b that extend past a fluid film covering the surface 26 of the inner tube 36 to introduce the additive gas into a central region of the plasma cell 35, as shown in FIG. 8b, or alternatively, the additive gas inlets 28 can introduce the additive gas into the fluid film. The additive gas inlets 28 and tubes 27a,b can further be adapted to direct the additive gas flow into the plasma cell 35. For example, the additive gas inlets 28 may be at the end of upwardly or downwardly angled tubes 27a,b that are adapted to direct a flow of additive gas downwards or upwards into the plasma cell 35.

In one version, the additive gas is be introduced into the reactor 50 via a manifold 13 comprising a ring 52 positioned in the pre-scrubbing chamber 31 having the additive gas inlets 28 spaced apart along the ring 52, as shown in FIG. 8c. The manifold ring 52 comprising the inlets 28 may be located downstream of the effluent gas inlets 23 to control the mixing of the effluent and additive gas. The ring 52 comprising the inlets 28 can be connected to the additive gas source 42 via tubes 27 that extend through the annular sidewall 65 of the pre-scrubbing cell 31. In one version, the manifold 13 can also serve to introduce one or more of film fluid and scrubbing fluid into the pre-scrubbing cell 31. For example, the manifold 13 may be connected to the film fluid source 22 and provide a flow of film fluid in the chamber via the inlets 28 or via separate film fluid inlets along the ring 52. Providing the additive gas and film fluid through the manifold 13 provides good mixing of the film fluid and additive gas to control abatement reactions between the additive and effluent gases. Providing the film fluid through the manifold 13 also enables the film fluid to at least partially scrub the effluent in pre-scrubbing chamber 31, and allows for the formation of a film that provides good coverage of the interior surface 26 of the inner tube 36.

The reactor 50 can also comprise a manifold 13a for introducing the additive gas into the pre-scrubbing cell 31 that comprises a ring 52a having additive gas inlets 28 at the end of tubes 98 that extend towards and even into the plasma cell 35, as shown in FIG. 8*d*. Thus, the manifold 13*a* provides for controlled mixing of the additive gas and effluent gas in a region near the plasma cell 35. The manifold 13*a* receives the additive gas via tubes 27*a* extending through the annular sidewall 65 and connecting to the additive gas source 42. A second manifold 13*b* can also be provided to separately introduce one or more of film fluid and scrubbing fluid into the pre-scrubbing cell 31. For example, film fluid may be introduced to scrub the effluent gas and form a fluid film over the interior surfaces of the reactor 50. The second manifold 13*b* comprises second inlets 28*b* spaced apart along a second ring 52*b* that extend into the pre-scrubbing cell 31 to dispense the film fluid. The second manifold 13*b* is connected to the film fluid source 22 via tubes 27*b* extending through the annular sidewall 65. The second manifold 13*b* can be located above or below the first manifold 13*a* in the reactor 50 according to space requirements and the desired mixing conditions. Providing the additive gas and film fluid via the manifolds 13*a*,*b* improves mixing of the additive gas, effluent gas and film fluid to control the abatement reactions and reduce corrosion of the reactor 50.

The additive gas inlets 28 can be adapted to introduce the additive gas in a flow direction that is across the effluent gas flow path. For example, for a tangentially directed effluent, the additive gas inlets 28 can be adapted to direct the additive gas substantially perpendicular relative to a circular component of the effluent gas flow path. By directing the additive gas in a substantially perpendicular direction to the circular component, the additive gas and effluent gas are better mixed to provide the desired gas composition for abatement. In the version shown in FIGS. 4 and 8*a* through 8*d*, the additive gas inlets 28 are adapted to direct the additive gas downwards in the pre-scrubbing cell 31 and across the effluent flow path.

The reactor 50 can comprise effluent gas inlets 23 that are adapted to introduce the effluent gas about a circle having a first radius in the pre-scrubbing cell 31, and additive gas inlets 28 that are adapted to introduce the effluent about a circle having a second radius in the pre-scrubbing cell 31 or plasma cell 35 that is smaller than the first radius, as shown in FIG. 3. The effluent gas can be introduced from effluent gas inlets 23 that are positioned along the outer circle 84 of the pre-scrubbing cell 31, and the additive gas introduced from additive gas inlets 28 positioned along an inner circle 86 adjacent to the inner tube 36 in the interior of the reactor 50. Providing the effluent gas and additive gas inlets 23, 28 at the different radii in the reactor 50 inhibits backfiring of the plasma reaction into the pre-scrubbing cell 31 by maintaining a distance between the effluent gas and additive gas flows in the pre-scrubbing cell 31. Furthermore, to inhibit the formation of a plasma in the pre-scrubbing cell 31, and/or to prevent backfiring of the abatement reaction, the reactor 50 can be shaped to have a pre-scrubbing cell 31 comprising a first diameter that is sufficiently large to inhibit the formation of a plasma in the pre-scrubbing cell, and a plasma cell comprising a second diameter that is sufficiently small to allow for the formation of a plasma. In the version shown in FIG. 1, the reactor 50 comprises a pre-scrubbing cell having a first distance between the annular sidewall 65 and the inner tube 36 that is sufficiently large to inhibit the formation of a plasma in the pre-scrubbing cell 31, and a plasma cell 35 comprising a second distance between the inner and outer tubes 36,38 that is narrower than the first distance, and that is sufficiently small to allow for the formation of a plasma in the plasma cell 35 via coupling between the first and second electrodes 14,16.

Improved scrubbing fluid inlets 32 can also be provided to enhance scrubbing of the effluent in the pre-scrubbing cell 31. The scrubbing fluid inlets 32 comprise nozzles 33 that are adapted to spray scrubbing fluid across the effluent flow path, as shown in FIGS. 1 and 3. Spraying the scrubbing fluid across the effluent flow path improves mixing between the effluent and scrubbing fluid and thereby provides better scrubbing of the effluent. In one version, the scrubbing fluid inlets 32 comprises nozzles 33 that are adapted to spray the scrubbing fluid in a direction that is substantially perpendicular relative to the circular component of the effluent flow path. For example, the scrubbing fluid nozzles 33 can direct the scrubbing fluid downward across the circular component of the effluent flow path. The scrubbing fluid can be introduced into the pre-scrubbing cell 31 by a scrubbing fluid distributor 70 comprising a manifold having a plurality of spaced apart inlets 32 above the effluent gas inlets 23, the scrubbing fluid inlets 32 being adapted to spray the scrubbing fluid in front of the effluent gas inlets 23 and across the effluent flow path as the effluent is introduced tangentially into the pre-scrubbing cell 31.

In one version, the scrubbing fluid nozzles 33 are adapted to direct a spray of scrubbing fluid away from a second electrode 16 having a dielectric cover 94 that extends into the plasma chamber 35 and towards, for example, the annular wall 65, as shown in FIG. 7*a*. Directing the scrubbing fluid away from the second electrode 16 may reduce the occurrence of electrical arcing between the first and second electrodes 14,16 by maintaining the surface 17 of the embedded second electrode 16 relatively dry. The spray of scrubbing fluid can be directed away from the second electrode 16 by angling the scrubbing fluid injector nozzles 33 towards the annular sidewall 65 and away from the second electrode 16. Furthermore, the spray angle of the fluid nozzles 33 can also be selected to be sufficiently narrow to avoid spraying the second electrode 16, while still providing a spray of effluent that is sufficiently wide to interact with and scrub the effluent gas. For example, a suitable spray angle may be from about 45° to about 150°, such as about 80°, for a reactor 50 having a distance between the covered second electrode 16 and the scrubbing fluid nozzles 33 of about 10 cm. While the scrubbing fluid nozzles 33 have been described as being located in the pre-scrubbing cell 31, they may also or alternatively be used in a post-scrubbing cell 29 or any other region in the reactor 50 where a directed flow of scrubbing fluid is desired.

Figure 10A:
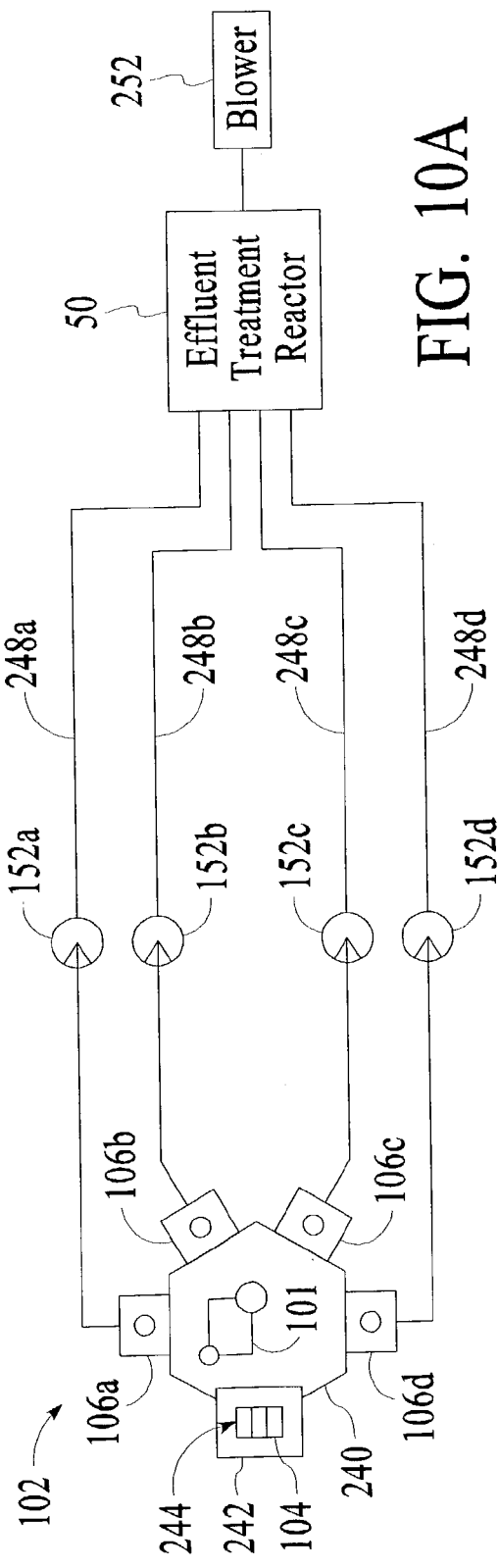
FIG. 10a is a schematic view of an apparatus comprising multiple process chambers and an effluent treatment system capable of treating the different compositions of effluent from the different process chambers.

The scrubbing fluid inlets 32 in the pre-scrubbing cell or post-scrubbing cells 29,31 can also comprise fluid injector nozzles 33 to direct the scrubbing fluid at a high velocity against a fluid impingement surface 60, such as a surface of a wall in scrubbing or plasma cell 30, 35, as shown in FIG. 10*a*. For example, the nozzles 33 can be adapted to direct the scrubbing fluid against a fluid impingement surface 60 comprising the surface 21 of the annular wall 65 of the pre-scrubbing chamber 31. As another example, the nozzles 33 can be adapted to direct the scrubbing fluid against a fluid impingement surface 60 comprising an outer surface of the inner tube 36. The scrubbing fluid directed against the impingement surface 60 flows over the surface 60 and protects the surface 60 from corrosion.

The scrubbing fluid nozzles 33 can be adapted to direct the scrubbing fluid against the fluid impingement surface 60 at a velocity that is sufficiently high to generate a scrubbing fluid mist to scrub the effluent. The scrubbing fluid mist is generated because the high impact velocity causes the impinging scrubbing fluid droplets to break apart into smaller droplets. The smaller scrubbing fluid droplets have a higher ratio of droplet surface area per volume of better contact with the effluent and a higher scrubbing efficiency. In one version, the scrubbing fluid inlet nozzles 33 comprise sonic injection nozzles adapted to impinge the scrubbing fluid against the fluid impingement surface 60 at supersonic velocities. The supersonic velocities are sufficiently high to break apart the scrubbing fluid droplets into the scrubbing fluid mist. The nozzles 33 capable of providing the supersonic velocities generally comprise a sonic injection port 87 comprising an inlet portion 62 adapted to receive the scrubbing fluid from the scrubbing fluid source 34, an outlet portion 63 adapted to direct the scrubbing fluid into the scrubbing cell 30, and a constricting portion 64 between the inlet and outlet portions 62, 63, wherein the inlet portion 62, constricting portion 63 and outlet portion 64 are shaped and sized to accelerate the scrubbing fluid to supersonic velocities, as shown in FIG. 9a. Scrubbing fluid traveling from the inlet portion 62 to the outlet portion 63 is accelerated by passing through the constricting portion 64 to the supersonic velocities, as described for example, in U.S. patent application Ser. No. 10061134 to Applied Materials, filed Jan. 30, 2002, which is hereby incorporated by reference in its entirety.

The scrubbing fluid nozzles 33 can also be adapted to induce vibrations in the impingement surface 60. The sonic injection nozzles can induce vibrations in the impingement surface 60 by directing the scrubbing fluid against the surface 60 at supersonic velocities. These vibrations enhance the scrubbing efficiency of the pre or post-scrubbing cells 31, 29 by "shaking off" particulates and contaminants that deposit on the impingement surface 60. Furthermore, these vibrations can also be transmitted from the impingement surface 60 to other surfaces in the reactor 50, such as an inner surface 24 of the portion of the dielectric wall 83 in the plasma cell 35, thereby reducing the build up of particulates on the dielectric wall 83. Inducing the vibrations in the dielectric wall 83 comprising the first embedded electrode 14 is particularly desirable because the dielectric wall 83 can be otherwise susceptible to a build of particulates that are attracted to the higher electric field about the first embedded electrode 14.

Figure 9B:
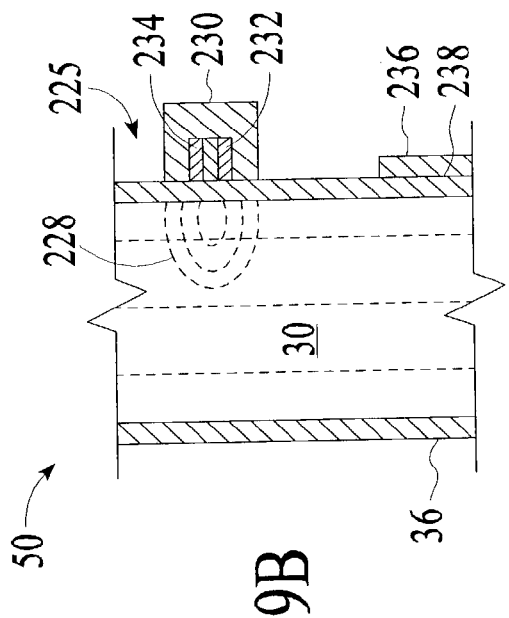
FIG. 9b is a sectional view of sonic transducer coupled to a wall of an effluent treatment reactor.
Figure 9A:
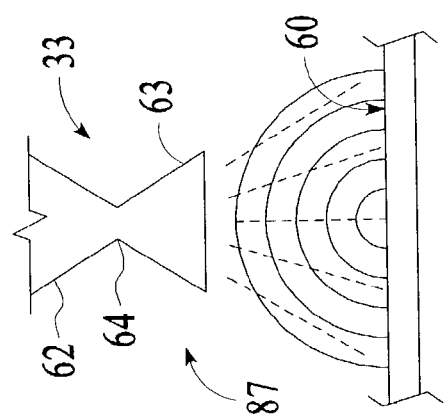
FIG. 9a is a sectional view of scrubbing fluid nozzle adapted to direct the scrubbing fluid against a fluid impingement surface in an effluent treatment reactor.

In one version, as shown in FIG. 9b, a sonic transducer 225 is coupled to a wall of the reactor 50, such as an outer or inner tube wall 38, 36. The sonic transducer 225 can be provided in addition to or as an alternative nozzles 33. The sonic transducer 225 induces sonic vibrations 228 in surfaces in the reactor 50 such as the surface of the wall 36, 38. Typically, the sonic transducer 225 comprises a transducer housing 230 which can be made of aluminum, and a piezo-electric transducer element 232 fastened, for example by glue, to an inner bottom wall 234 of the transducer housing 230. The transducer housing 230 is fastened to the walls 36, 38 of the reactor 50 to allow the sonic vibrations generated by the transducer 225 to be imparted to the chamber walls. The sonic transducer 225 can be an ultrasonic transducer that generates ultrasound waves, for example, in a frequency range of from about 20 KHz to about 20 MHz. A suitable ultrasonic transducer comprises a cylindrical piezoelectric element made of barium titanate or lead titanate zirconate, on whose circular surfaces are arranged electrodes comprising a silver or copper metallization film pattern (not shown). Electrical connectors are joined to the electrodes by soldering and connected to an electronic power circuit that provides a pulsed electrical wave to power the sonic transducer. Optionally, sonic decoupling material 236 may be packed around exposed portions of the transducer not in contact with the wall, or around other portions 238 of the wall or scrubbing cell 30 (as shown), to prevent external transmission of the sonic vibrations to other portions of the effluent treatment apparatus. The decoupling material 236 may be a compressed three dimensional weave of acoustic dampening fibers made of a dense, non-resonant material; or an elastic material, such as an epoxy resin, polyurethane or silicone elastomers.

Figure 12A:
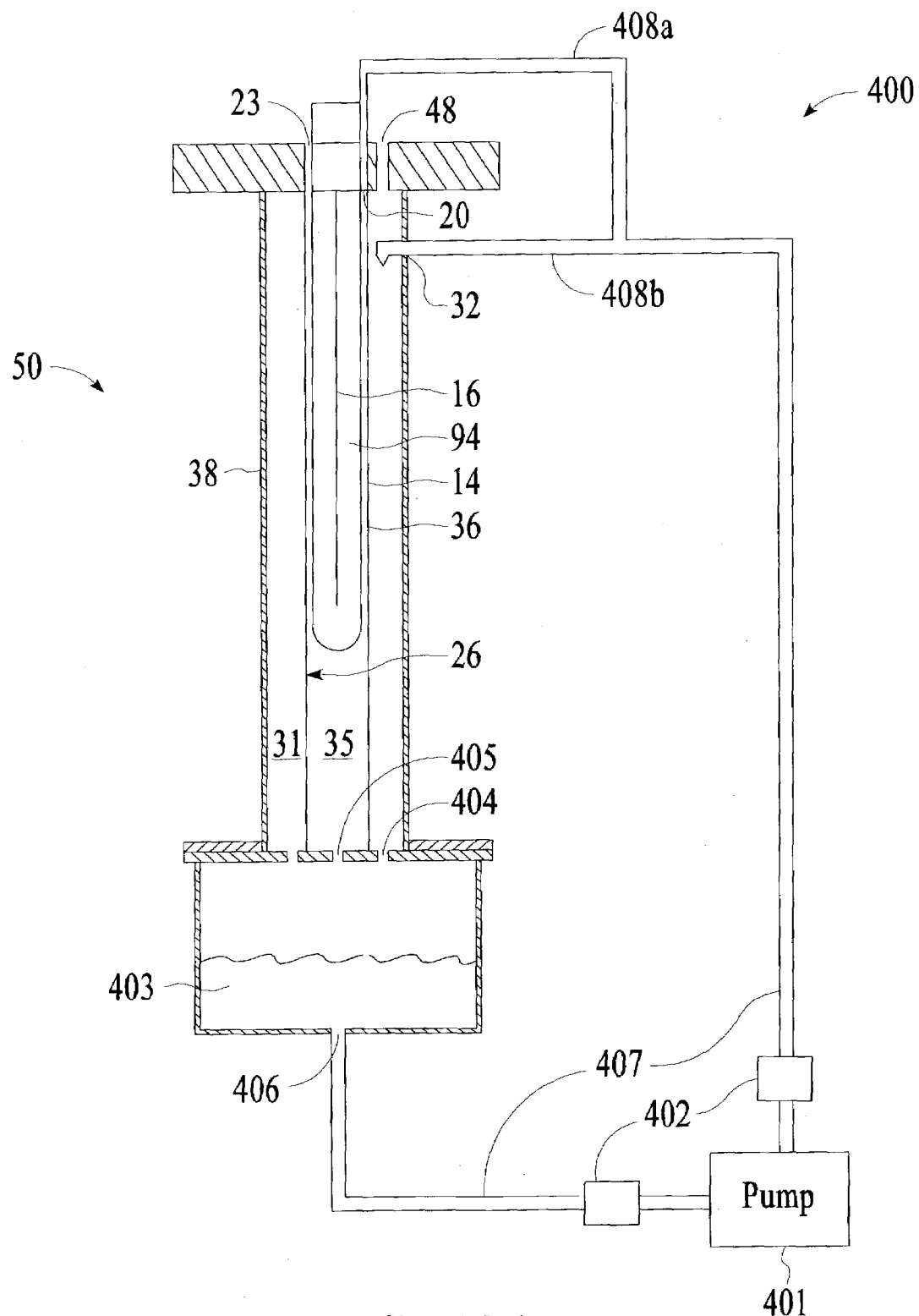
FIG. 12a is a partial sectional side view of a treatment reactor having a sump and fluid recirculation system.

The fluid used in the reactor 50 can also be advantageously recirculated in the system. In one version of a fluid recirculation system, a fluid sump 403 is provided to collect one or more of film fluid and scrubbing fluid used in the reactor 50, for example, at the bottom of the reactor 403, as shown in FIG. 12a. In operation, fluid introduced into the reactor 50 via the fluid film inlet 20 and scrubbing fluid inlets 32 flows through the scrubbing and plasma cell 30,35 and into the sump 403 via the inlets 404,405. For example, film fluid introduced into the plasma cell 35 via the film fluid inlet 20 flows along the inner surface 26 of the inner tube 36 and through the inlet 405 into the sump 403. Scrubbing fluid introduced into the scrubbing cell 30 via the scrubbing fluid inlets 32 flows through the scrubbing cell and into the sump 403 via the inlets 404. Scrubbing fluid from the pre-scrubbing cell 31 (not shown) can also flow into the sump 403 via one or more of the inlets 405, 404. The fluid collected in the sump 403 is drained or pumped from the sump 403 via a fluid outlet 406, for example when the level of fluid in the sump 403 reaches a predetermined height. The effluent gas from the plasma cell 35 can also be introduced into the sump 403 via the inlet 405, where the volume of fluid retained in the sump 403 redirects the effluent gas towards the inlets 404 leading to the external scrubbing cell 30. Thus, the sump 403 allows for the collection of fluid as well as the redirection and recirculation of the effluent gas in the treatment reactor 50 along a desired gas flow path.

The fluid recirculation system 400 can recirculate at least a portion of the fluid collected in the sump 403 back to the reactor 50 for re-use, as shown in FIG. 12, to minimize release of contaminated fluid and its environmental impact. By recirculating the fluid, the fluid recirculation system 400 reduces the volume of fluid required to perform the abatement process, thereby reducing the overall costs of the process. The fluid recirculation system 400 comprises a pump 401 adapted to pump out fluid collected in the sump 401 via a recirculation conduit 407. The recirculation conduit 407 delivers the pumped fluid to one or more of the fluid film inlet 20 and pre or post-scrubbing fluid inlets 32 via separate or combined delivery conduits 408a, 408b. One or more filters 402 can be placed along the recirculated fluid flow path, such as in the recirculation conduit 407, to filter particulates from the fluid before delivering the fluid back to the reaction chamber 50. Fluid controllers 410 such as temperature controllers, pH controllers, pressure controllers and fluid level controllers can also be provided as a part of fluid recirculation system 400, and may in turn be controlled by a main system controller 300.

Figure 12B:
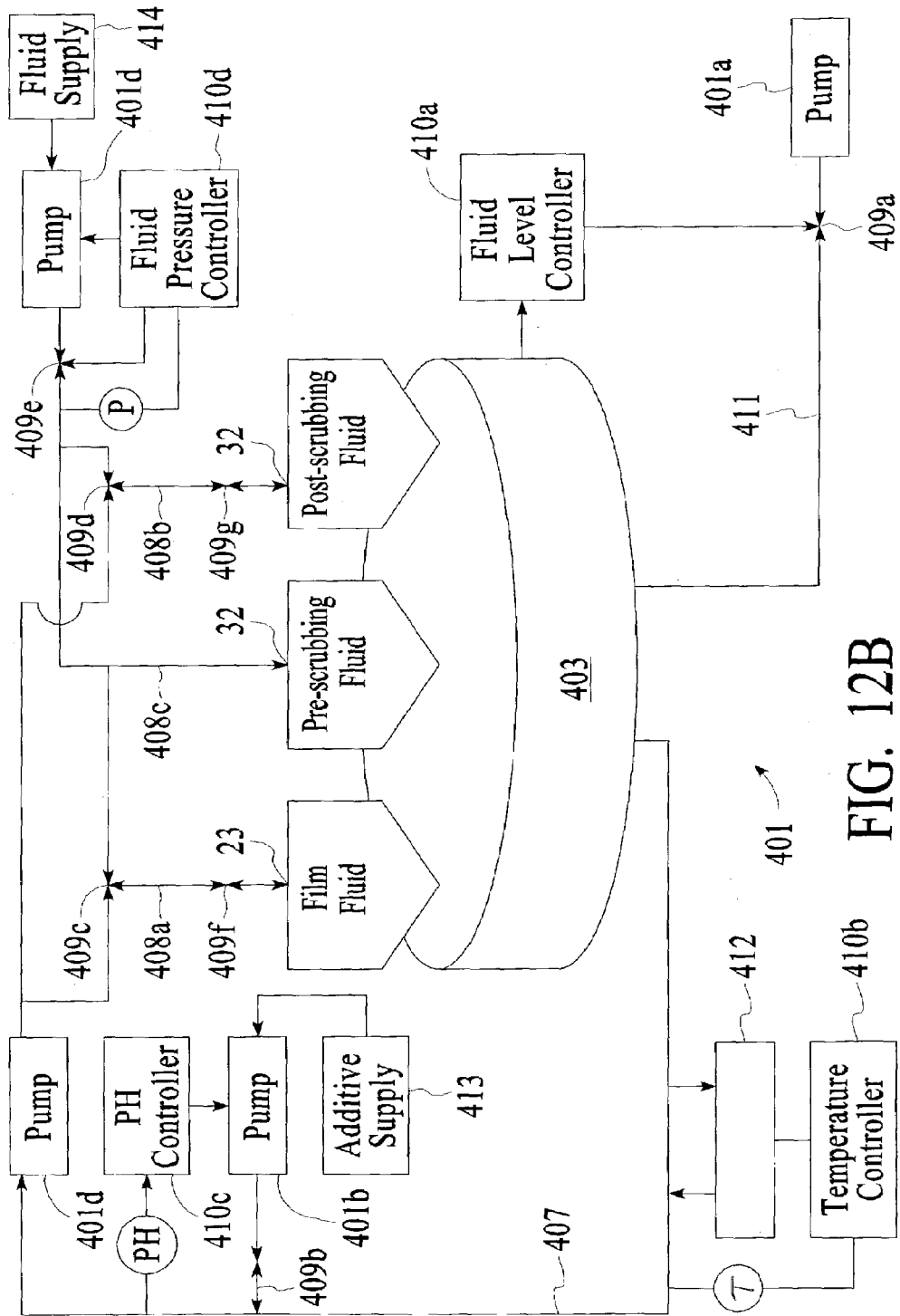
FIG. 12b is an illustrative diagram of another embodiment of a fluid recirculation system.

FIG. 12b shows a preferred embodiment of the fluid recirculation system 400. As shown in this embodiment, fluid introduced into the reactor 50 via the pre and post scrubbing inlets 32 and fluid film inlet 20 is delivered to the sump 403. A fluid level controller 410a monitors the level of fluid in the sump 403 and is adapted to operate one or more pumps 401 and valves 409 to control the level of the fluid in the sump 403. At least a portion of the fluid collected in the sump 403 flows or is pumped into the recirculation conduit 407 and is delivered back to the treatment reactor 50. Fluid in the sump 403 can also be removed from the recirculation system 400 for disposal via a release conduit 411 connected to a valve 409a and pump 401a. For example, the fluid may be removed from the system 400 if the fluid level controller 410 determines the level of the fluid in the sump 403 is too high.

The recirculation system 400 comprises a temperature controller 410b adapted to monitor and control the temperature of the recirculated fluid. The temperature controller 410b is in communication with a temperature sensor T that is adapted to detect the temperature of the fluid flowing through the recirculation conduit 407 and send a signal related to the detected temperature to the controller 410b. The temperature controller 410b receives the signal and operates a heat exchanger 412 to heat or cool the fluid in response to the signal and according to the desired fluid temperature. For example, the temperature controller 410b may operate a heat exchanger 412 comprising a cooling unit to cool the fluid. Cooling of the fluid may be desired if the fluid has been heated by an exothermic effluent abatement reaction in the treatment reactor 50. The heat exchanger 412 can also or alternatively comprise a heating unit to heat the fluid, such as a resistive heating unit or heat lamps.

The recirculation system 400 further comprises a pH controller 410c adapted to monitor and control the pH of the recirculated fluid. The pH controller 410c is in communication with a pH sensor adapted to detect the pH of the fluid in the recirculation conduit and send a signal related to the detected pH to the pH controller 410c. The pH controller 410c operates one or more of a pump 401b and valve 409b to provide a pH additive from a pH additive supply 413 to the fluid in response to the detected pH. The pH additive is an additive that adjusts the pH of the fluid, such as for example an acidic or basic additive. For example, a pH additive comprising a basic solution may be desirable for controlling the pH of the fluid, as effluent abatement reactions—such as those involving fluorine-containing gases, can undesirably lower the pH of the fluid. An example of a suitable basic pH additive is a NaOH solution. The pump 401b and valve 409b are operated by the pH controller 410c to provide an amount of the pH additive from the additive supply that suitably adjusts the pH of the fluid.

A fluid pressure controller 410d in communication with a fluid pressure sensor P can be used to monitor and control the pressure of the fluid being recirculated to the reactor 50. The pressure sensor detects the pressure of the fluid and sends a signal related to the detected pressure to the pressure controller 410d, which is adapted to operate one or more of a valve 409e and pump 401d to control the pressure of the fluid. For example, if the pressure of the fluid in the recirculation system 400 is too low, the pressure controller 410d is adapted to operate the pump 401d and valve 409e to provide fresh fluid from the fluid supply 414 to the reactor 50. The fluid pressure controller 410d, pumps 401c,d and valves 409c,d,e,f and g, which may be operated by the main system controller 300, cooperate to provide a desired flow rate of fluid to the reactor 50, and to provide the desired individual flow rates of fluid to the film fluid inlet 23, pre-scrubbing and post-scrubbing inlets 32.

The treatment reactor 50 described above is suitable to treat effluent exhausted from one or more semiconductor process chambers 106. For example, the treatment reactor 50 may be a part of a substrate processing apparatus 102 comprising a number of process chambers 106a–106d mounted on a platform 240 as shown in FIG. 10a. The platform 240 contains and provides electrical, plumbing, and other support functions for the apparatus 102. A common load lock chamber 242 serves to hold a cassette 244 of substrates 104, such as silicon wafers, and a robotic transport 101 loads each wafer from the cassette 244 into one of the process chambers 106a–d and vice versa. The chambers 106a–d can include, for example, different types of substrate etching chambers capable of etching a substrate 104 or deposition chambers capable of depositing material on a substrate 104 by physical or chemical vapor deposition. Advantageously, the effluent treatment reactor 50 can be connected via the conduits 248a–d to the effluent streams coming from the exhaust pumps 152a–d. Each exhaust pump 152a–d serves to exhaust a particular process chamber 106a–d, respectively. After the effluent treatment reactor 50, a blower (not shown) may be used to facilitate the passage of effluent through the reactor 50.

Figure 10B:
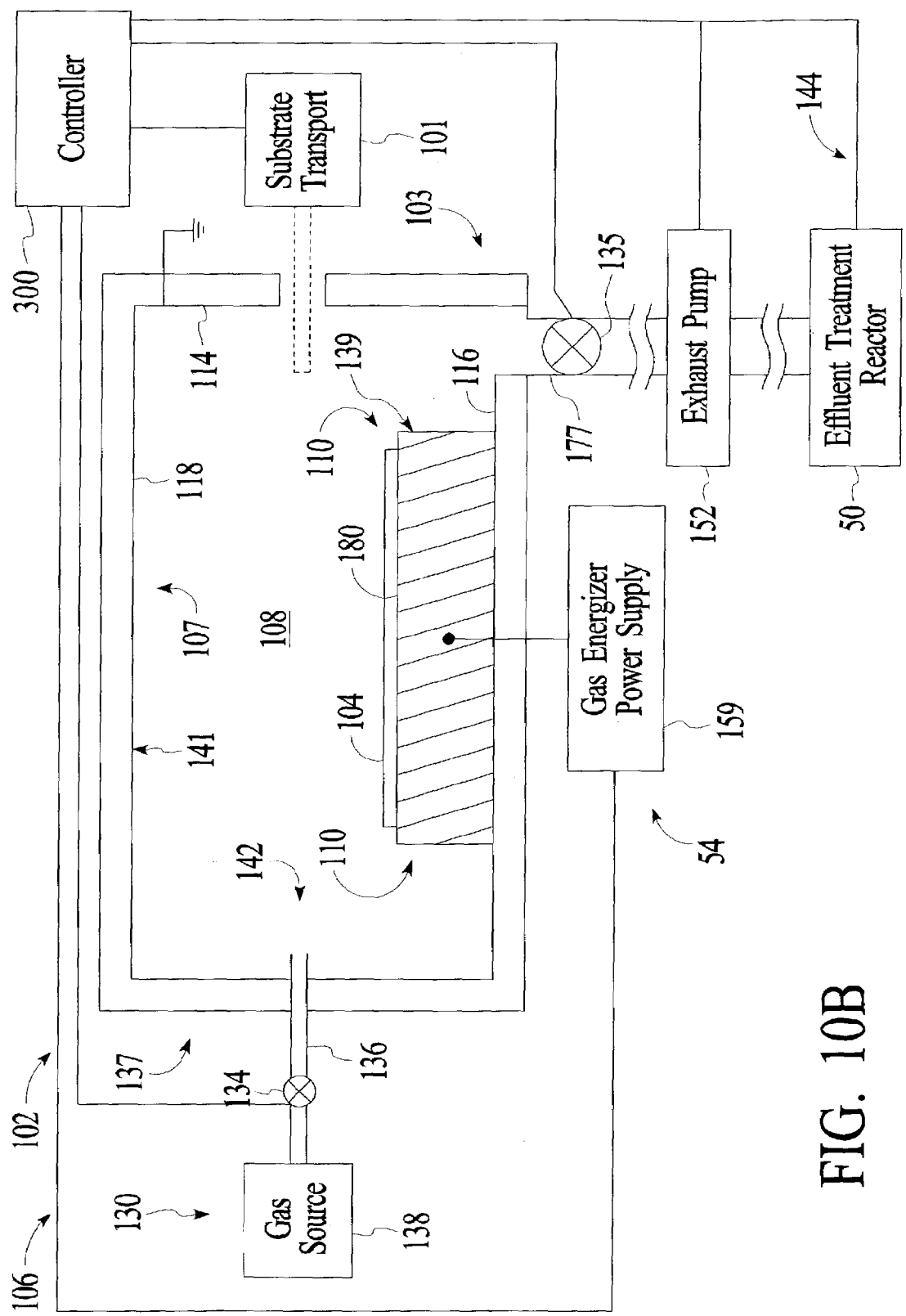
FIG. 10b is a sectional schematic view of a version of a process chamber according to an embodiment of the present invention.

An embodiment of an apparatus 102 comprising a process chamber 106 suitable for processing a substrate 104 is shown in FIG. 10b. The process chamber 106 is suitable for processing substrates 104, such as semiconductor wafers, and may be adapted by those of ordinary skill to process other substrates 104, such as flat panel displays, polymer panels, or other electrical circuit receiving structures. The chamber 106 is particularly useful for processing layers, such as etch resistant, silicon-containing, metal-containing, dielectric, and/or conductor layers on the substrate 104. Generally, the process chamber 106 comprises a wall 107, such as an enclosure wall 103, which may comprise a ceiling 118, sidewalls 114, and a bottom wall 116 that enclose a process zone 108. In operation, process gas is introduced into the chamber 106 through a gas supply 130 that includes a process gas source 138, and a gas distributor 137. The gas distributor 137 may comprise one or more conduits 136 having one or more gas flow valves 134 and one or more gas outlets 142 around a periphery of the substrate 104 which may be held in the process zone 108 on a support 110 having a substrate receiving surface 180. Alternatively, the gas distributor 130 may comprise a showerhead gas distributor (not shown). Spent process gas and etchant byproducts are exhausted from the chamber 106 through an exhaust 144 which may include an exhaust conduit 177 that receives spent process gas from the process zone 106, a throttle valve 135 to control the pressure of process gas in the chamber 106, the treatment reactor 50, and one or more exhaust pumps 152.

Figure 10C:
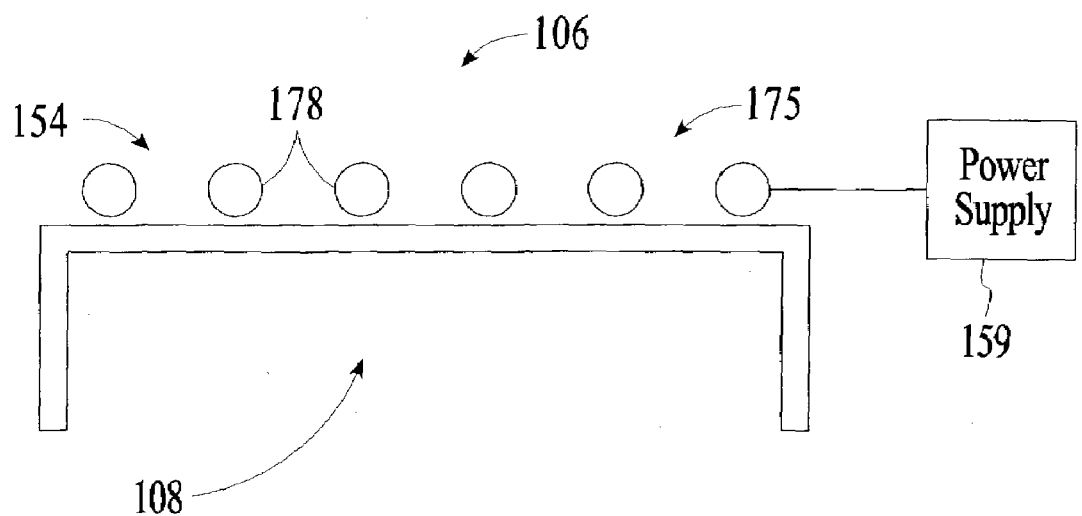
FIG. 10c is a partial sectional side view of another version of a gas energizer suitable for the chamber of FIG. 10b.
Figure 10D:
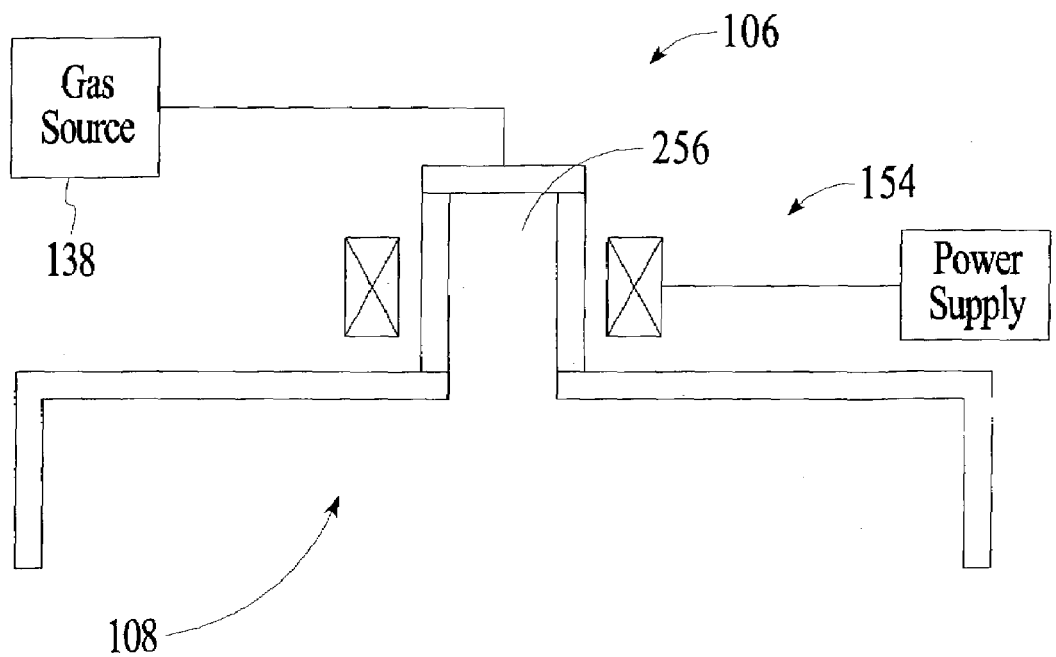
FIG. 10d is a partial sectional side view of yet another version of a gas energizer suitable for the chamber of FIG. 10b.

The process gas may be energized to process the substrate 104 by a gas energizer 154 that couples energy to the process gas in the process zone 108 of the chamber 106. In the version shown in FIG. 10b, the gas energizer 154 comprises process electrodes 139, 141 that may be powered by a power supply 159 to energize the process gas. The process electrodes 139, 141 may include an electrode 141 that is or is in a wall, such as a sidewall 114 or ceiling 118 of the chamber 106 that may be capacitively coupled to another electrode 139, such as an electrode in the support 110 below the substrate 104. Alternatively or additionally, as shown in FIG. 10c, the gas energizer 154 may comprise an antenna 175 comprising one or more inductor coils 178 which may have a circular symmetry about the center of the chamber 106. In yet another version, the gas energizer 154 may comprise a microwave source and waveguide to activate the process gas by microwave energy in a remote zone 256 upstream from the chamber 106, as shown in FIG. 10d.

To process a substrate 104, the process chamber 106 is evacuated and maintained at a predetermined sub-atmospheric pressure. The substrate 104 is then provided on the support 110 by a substrate transport 101, such as for example a robot arm and a lift pin system. The gas supply 130 provides a process gas to the chamber 106 and the gas energizer 154 couples RF or microwave energy to the process gas to energizes the gas to process the substrate 104 by coupling RF or microwave energy to the gas. Similarly, to clean the chamber after processing of the substrate 104, the gas supply 130 provides a process gas comprising a cleaning gas to the chamber 106 and the gas energizer 154 energizes the cleaning gas to clean the chamber 106. Effluent generated during the chamber process is exhausted from the chamber 106 and received by the treatment reactor 50, where the effluent may be abated to reduce the hazardous gas content of the effluent.

Figure 11:
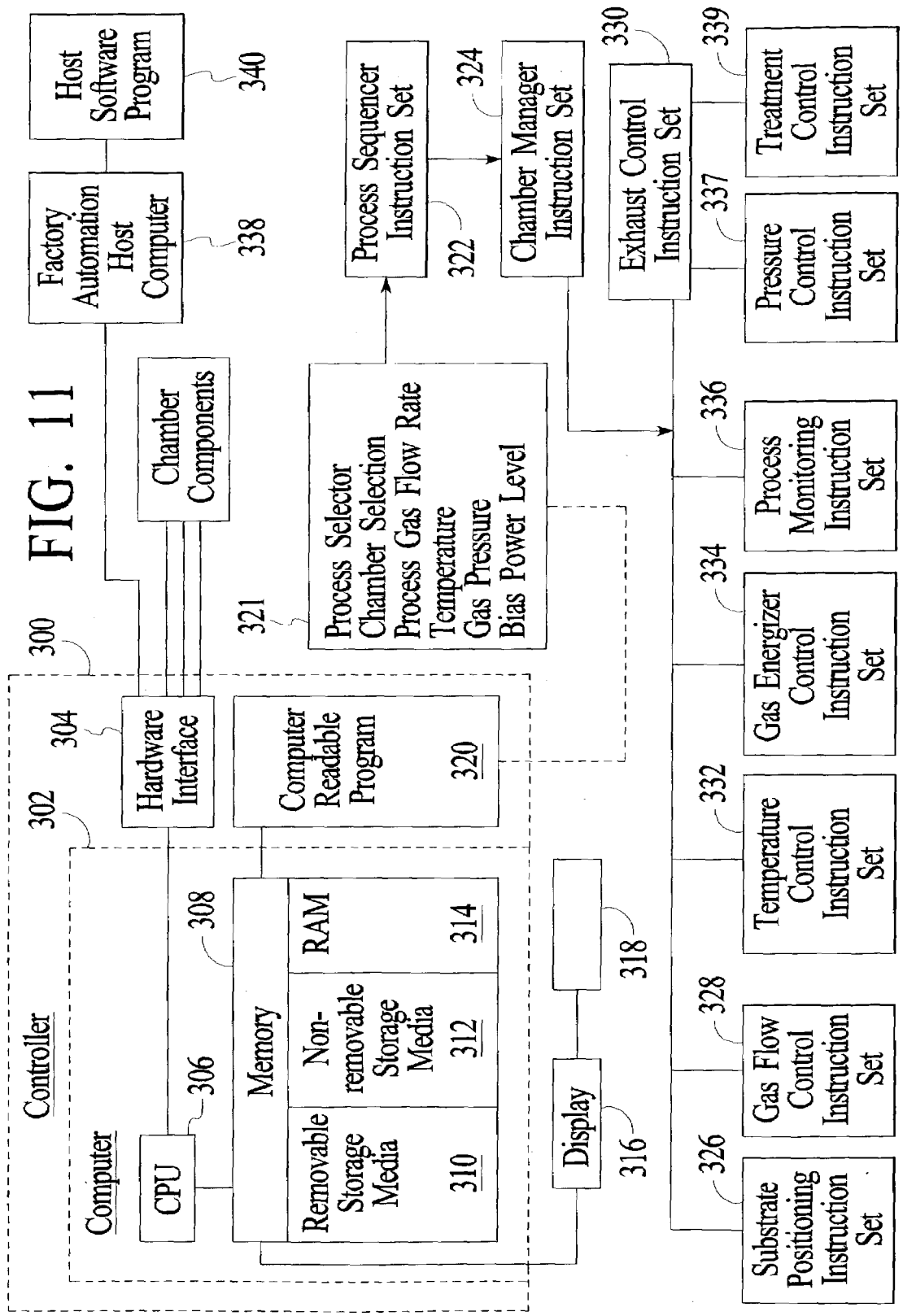
FIG. 11 is an illustrative block diagram of a controller comprising a computer readable program.

The substrate processing apparatus 102 comprising the process chamber 106 and treatment reactor 50 may be operated by a controller 300 via a hardware interface 304. The controller 300 may comprise a computer 302 which may comprise a central processor unit (CPU) 306, such as for example a 68040 microprocessor, commercially available from Synergy Microsystems, California, or a Pentium Processor commercially available from Intel Corporation, Santa Clara, Calif., that is coupled to a memory 308 and peripheral computer components, as shown in FIG. 11. Preferably, the memory 308 may include a removable storage media 310, such as for example a CD or floppy drive, a non-removable storage media 312, such as for example a hard drive, and random access memory 314. The controller 300 may further comprise a plurality of interface cards including, for example, analog and digital input and output boards, interface boards, and motor controller boards. The interface between an operator and the controller 300 can be, for example, via a display 316 and a light pen 318. The light pen 318 detects light emitted by the monitor display 316 with a light sensor in the tip of the light pen 318. To select a particular screen or function, the operator touches a designated area of a screen on the monitor 316 and pushes the button on the light pen 318. Typically, the area touched changes color, or a new menu is displayed, confirming communication between the user and the controller 300.

In one version the controller 300 comprises a computer-readable program 320 may be stored in the memory 308, for example on the non-removable storage media 312 or on the removable storage media 310. The computer readable program 320 generally comprises process control software comprising program code to operate the chamber 106 and its components, process monitoring software to monitor the processes being performed in the chamber 106, safety systems software, and other control software, as for example, illustrated in FIG. 11. The computer-readable program 320 may be written in any conventional computer-readable programming language, such as for example, assembly language, C++, Pascal, or Fortran. Suitable program code is entered into a single file, or multiple files, using a conventional text editor and stored or embodied in computer-usable medium of the memory 308. If the entered code text is in a high level language, the code is compiled, and the resultant compiler code is then linked with an object code of pre-compiled library routines. To execute the linked, compiled object code, the user invokes the object code, causing the CPU 306 to read and execute the code to perform the tasks identified in the program.

FIG. 11 also shows an illustrative block diagram of a hierarchical control structure of a specific embodiment of a computer readable program 320 according to the present invention. Using a light pen interface, a user enters a process set and chamber number into the computer readable program 320 in response to menus or screens displayed on the CRT terminal. The computer readable program includes program code to control the substrate position, gas flow, gas pressure, temperature, RF power levels, and other parameters of a particular process, as well as code to monitor the chamber process. The process sets are predetermined groups of process parameters necessary to carry out specified processes. The process parameters are process conditions, including without limitations, gas composition, gas flow rates, temperature, pressure, gas energizer settings such as RF power levels.

The process sequencer instruction set 322 comprises program code to accept a chamber type and set of process parameters from the computer readable program 320 and to control its operation. The sequencer program 322 initiates execution of the process set by passing the particular process parameters to a chamber manager instruction set 324 that controls multiple processing tasks in the process chamber 106. Typically, the process chamber instruction set 324 includes a substrate positioning instruction set 326, a gas flow control instruction set 328, a temperature control instruction set 332, a gas energizer control instruction set 334, a process monitoring instruction set 336, and an exhaust control instruction, set 330. Typically, the substrate positioning instruction set 326 comprises program code for controlling chamber components that are used to load the substrate 104 onto the support 110 and optionally, to lift the substrate 104 to a desired height in the chamber 106. The gas flow control instruction set 328 comprises program code for controlling the flow rates of different constituents of the process gas. The gas flow control instruction set 328 regulates the opening size of one or more gas flow meters 134 to obtain the desired gas flow rate into the chamber 106. The temperature control instruction set 332 comprises program code for controlling temperatures in the chamber 106, such as the temperature of the substrate 104. The gas energizer control instruction set 334 comprises program code for setting one or more of a bias power level applied to the process electrodes 139,141 in the chamber 106 and a source power levels applied to the antenna 156 to energize a process gas in the chamber 106. The process monitoring instruction set 334 comprises code for monitoring the process in the chamber 106.

The exhaust control instruction set 330 comprises program code for controlling the pressure in the chamber 106 and controlling the emissions of hazardous gases from the substrate processing apparatus 102. For example, the exhaust control instruction set 330 may comprise a pressure control instruction set 337 comprising program code to control the pressure in the chamber by regulating the open/close position of the throttle valve 150 in the exhaust conduit 177. The exhaust control instruction set 330 may further comprise a treatment control instruction set 339 adapted to operate the treatment reactor 50 to treat effluent exhausted from the substrate processing chamber 106. For example, the treatment control instruction set 339 may comprise program code to regulate the flow rate of scrubbing fluid provided to the pre or post scrubbing cells 31, 29 or regulate the flow rate of additive gas being introduced into the effluent in the treatment reactor 50. The treatment control instruction set 339 may also comprise program code to control the fluid recirculation system 400, for example by controlling one or more valves 409, pumps 401 and other controllers 410. The treatment control instruction set 339 may further comprise program code to control the power level applied to bias the first and second electrodes 14,16 in the treatment reactor 50.

The data signals received by and/or evaluated by the controller 300 may be sent to a factory automation host computer 338. The factory automation host computer 318 may comprise a host software program 340 that evaluates data from several systems, platforms or chambers 106, and for batches of substrates 104 or over an extended period of time, to identify statistical process control parameters of (i) the processes conducted on the substrates 104, (ii) a property that may vary in a statistical relationship across a single substrate 104, or (iii) a property that may vary in a statistical relationship across a batch of substrates 104. The host software program 340 may also use the data for ongoing in-situ process evaluations or for the control of other process parameters. A suitable host software program comprises a WORKSTREAM™ software program available from aforementioned Applied Materials. The factory automation host computer 338 may be further adapted to provide instruction signals to (i) remove particular substrates 104 from the processing sequence, for example, if a substrate property is inadequate or does not fall within a statistically determined range of values, or if a process parameter deviates from an acceptable range; (ii) end processing in a particular chamber 106, or (iii) adjust process conditions upon a determination of an unsuitable property of the substrate 104 or process parameter. The factory automation host computer 338 may also provide the instruction signal at the beginning or end of processing of the substrate 104 in response to evaluation of the data by the host software program 340.

Although exemplary embodiments of the present invention are shown and described, those of ordinary skill in the art may devise other embodiments which incorporate the present invention, and which are also within the scope of the present invention. For example, the treatment reactor 50 may comprise different arrangements of coaxial plasma and scrubbing cells 35, 30 and pre-scrubbing cell 31. Also, the embedded electrode 14 may comprise shapes other those specifically mentioned, as would be apparent to those of ordinary skill in the art. Furthermore, the terms below, above, bottom, top, up, down, first and second and other relative or positional terms are shown with respect to the exemplary embodiments in the figures and are interchangeable. Therefore, the appended claims should not be limited to the descriptions of the preferred versions, materials, or spatial arrangements described herein to illustrate the invention.

What is claimed is:

1. An effluent treatment reactor to treat an effluent exhausted from a process chamber, the effluent treatment reactor comprising:
   (a) an effluent inlet to receive the effluent from the process chamber;
   (b) a plasma cell comprising tubular electrodes capable of being electrically biased to couple energy to effluent received in the plasma cell, at least one electrode embedded in a dielectric, and a fluid film inlet adapted to provide a fluid film over a surface of at least one electrode in the plasma cell while power is coupled between the electrodes through the fluid film and the dielectric;
   (c) a scrubbing cell coaxially exterior to the plasma cell, the scrubbing cell comprising a scrubbing fluid inlet to introduce scrubbing fluid into effluent received in the scrubbing cell and a scrubbing fluid outlet; and
   (d) an effluent outlet to release the treated effluent.

2. A reactor according to claim 1 wherein the plasma cell comprises a first cylinder enclosing a first volume, and the scrubbing cell is defined by a second volume between the first cylinder and a second cylinder coaxially exterior to the first cylinder, and wherein the first cylinder comprises a first electrode embedded in a dielectric material and a second electrode extends into the first volume enclosed by the first cylinder.

3. A reactor according to claim 1 further comprising a pre-scrubbing cell having the effluent inlet, the pre-scrubbing cell comprising one or more scrubbing fluid inlets.

4. A reactor according to claim 1 wherein the fluid film inlet is adapted to provide a fluid film that flows by gravity over a surface of at least one of the electrodes in the plasma cell.

5. An effluent treatment reactor to treat an effluent exhausted from a process chamber, the effluent treatment reactor comprising:
   (a) an effluent inlet to receive the effluent from the process chamber;
   (b) coaxial inner and outer tubes, the outer tube having capped ends and extending beyond the inner tube such that received effluent can flow from one tube to another, at least one tube comprising a dielectric having an embedded first electrode that may be electrically coupled to a second electrode about the tube, and at least one tube comprising a scrubbing fluid inlet to introduce a scrubbing fluid into the tube to form a fluid film over a surface of at least one electrode while power is coupled between the electrodes through the fluid film and the dielectric;
   (c) a voltage source to electrically bias the first and second electrodes to transfer power to the effluent to form a plasma therein to treat the effluent and
   (d) an effluent outlet to release the treated effluent.

6. A reactor according to claim 5 wherein the tubes are concentric cylinders.

7. A reactor according to claim 6 wherein the scrubbing fluid inlet at least partially surrounds the inner tube comprising the dielectric having the embedded first electrode.

8. A reactor according to claim 5 wherein the first electrode comprises a plurality of spaced apart rings.

9. A reactor according to claim 5 further comprising a fluid film inlet to provide a fluid film over an inner surface of the inner tube.

10. An effluent treatment reactor to treat an effluent from a process chamber, the effluent treatment reactor comprising:
   (a) a pre-scrubbing cell comprising:
      an effluent inlet to receive the effluent from the process chamber; and
      a pre-scrubbing fluid inlet to dispense a scrubbing fluid in the received effluent;
   (b) a plasma cell to receive effluent from the pre-scrubbing cell, the plasma cell comprising:
      a first cylinder having a first electrode;
      a second electrode embedded in a dielectric and extending into the first cylinder;
      a fluid source to maintain a fluid film over an interior surface of the first cylinder; and
      a voltage source to electrically power the first and second electrodes to form a plasma of the received effluent;
   (c) a post-scrubbing cell in the volume between the first cylinder and a second cylinder coaxially external to the first cylinder, the post-scrubbing cell comprising:
      post-scrubbing inlets to introduce scrubbing fluid into the post-scrubbing cell to treat the effluent passing therethrough; and
      a scrubbing fluid outlet; and
   (d) an effluent outlet to release the treated effluent.

11. A reactor according to claim 10 further comprising additive gas inlets adapted to introduce an additive gas into at least one of the pre-scrubbing cell and plasma cell.

12. A reactor according to claim 10 further comprising a fluid source to maintain a fluid film that flows by gravity over an interior surface of the first cylinder.

13. An effluent treatment reactor to treat an effluent from a process chamber, the effluent treatment reactor comprising:

a pre-scrubbing cell to receive the effluent from the process chamber, the pre-scrubbing cell comprising effluent injector nozzles that are spaced apart from one another and capable of injecting effluent into the pre-scrubbing cell at directions that are tangential to a circle within the pre-scrubbing cell, a scrubbing fluid inlet to spray a scrubbing fluid across the path of the tangentially injected effluent to treat the effluent, and additive gas inlets adapted to introduce an additive gas into the effluent;

a plasma cell to form a plasma of the pre-scrubbed effluent and additive gases, the plasma cell comprising first and second electrodes, at least one electrode embedded in a dielectric, and a fluid film inlet to maintain a fluid film over a surface of at least one electrode; and a post-scrubbing cell to scrub the effluent and additive gases.

* * * * *